(12) United States Patent
Michelassi et al.

(10) Patent No.: US 7,640,205 B2
(45) Date of Patent: Dec. 29, 2009

(54) SYSTEMS AND METHODS FOR ACCESSING RECONCILEMENT INFORMATION

(75) Inventors: Leslie Michelassi, Seattle, WA (US); Lisa C. Tidwell, Houston, TX (US); Randy Templeton, Sugar Land, TX (US); Sharat Shankar, Highlands Ranch, CO (US)

(73) Assignee: First Data Corporation, Greenwood Village, CO (US)

( * ) Notice: Subject to any disclaimer, the term of this patent is extended or adjusted under 35 U.S.C. 154(b) by 726 days.

(21) Appl. No.: 10/744,706

(22) Filed: Dec. 23, 2003
(Under 37 CFR 1.47)

(65) Prior Publication Data
US 2005/0137951 A1 Jun. 23, 2005

(51) Int. Cl.
*G06Q 40/00* (2006.01)

(52) U.S. Cl. .............. 705/37; 705/38; 705/36; 705/35

(58) Field of Classification Search ............ 705/64, 705/36, 38, 37, 35; 713/186
See application file for complete search history.

(56) References Cited

U.S. PATENT DOCUMENTS

| | | | |
|---|---|---|---|
| 4,109,238 A | | 8/1978 | Creekmore |
| 4,187,498 A | | 2/1980 | Creekmore |
| 5,327,508 A | | 7/1994 | Deaton et al. |
| 5,668,897 A | * | 9/1997 | Stolfo .................. 382/283 |
| 5,679,938 A | | 10/1997 | Templeton et al. |
| 5,679,940 A | | 10/1997 | Templeton et al. |
| 5,696,739 A | | 12/1997 | Chang |
| 5,781,654 A | | 7/1998 | Carney |
| 5,930,777 A | | 7/1999 | Barber |
| 6,021,397 A | * | 2/2000 | Jones et al. ........... 705/36 R |
| 6,115,709 A | | 9/2000 | Gilmour et al. |
| 6,170,744 B1 | | 1/2001 | Lee et al. |

(Continued)

FOREIGN PATENT DOCUMENTS

WO    WO 01/97134 A1    12/2001

(Continued)

OTHER PUBLICATIONS

Certegy to Offer Visa Point-of-Sale Check Service PR Newswire. New York: Sep. 25, 2003. p. 1.*

(Continued)

*Primary Examiner*—Frantzy Poinvil
*Assistant Examiner*—Clement Graham
(74) *Attorney, Agent, or Firm*—Sutherland Asbill & Brennan LLP

(57) ABSTRACT

Systems and methods are disclosed for assisting a check-cashing entity to efficiently and accurately locate relevant positive pay information or other reconcilement information regarding a check or other negotiable instrument that has been presented to a check-cashing entity in association with a request to cash, deposit, use as payment or otherwise accept the check or negotiable instrument. In various embodiments, when a plurality of potentially useful sources of reconcilement information are identified for querying in association with a proposed check-cashing transaction, a decision regarding how many of the sources to query and/or how long to continue to query may be based at least in part on factors relating to the transaction, factors relating to characteristics of the information sources, and factors relating to preferences on the part of the check-cashing entity.

19 Claims, 10 Drawing Sheets

U.S. PATENT DOCUMENTS

| | | | |
|---|---|---|---|
| 6,196,460 B1 | 3/2001 | Shin | |
| 6,464,134 B1 | 10/2002 | Page | |
| 6,505,772 B1 | 1/2003 | Mollett et al. | |
| 6,547,132 B1 | 4/2003 | Templeton et al. | |
| 6,581,043 B1 | 6/2003 | Wallin et al. | |
| 6,754,640 B2 | 6/2004 | Bozeman | |
| 6,764,013 B2 | 7/2004 | Ben-Aissa | |
| 6,807,607 B1 | 10/2004 | Lamparter | |
| 6,827,260 B2 | 12/2004 | Stoutenburg et al. | |
| 7,100,820 B2 | 9/2006 | Michelassi et al. | |
| 2001/0042785 A1* | 11/2001 | Walker et al. | 235/379 |
| 2002/0032651 A1 | 3/2002 | Embrey | |
| 2002/0052852 A1* | 5/2002 | Bozeman | 705/64 |
| 2002/0156980 A1 | 10/2002 | Rodriguez | |
| 2002/0178112 A1 | 11/2002 | Goeller et al. | |
| 2003/0093368 A1 | 5/2003 | Manfre et al. | |
| 2003/0130919 A1 | 7/2003 | Templeton et al. | |
| 2003/0172030 A1 | 9/2003 | Volgunin | |
| 2003/0217003 A1 | 11/2003 | Weinflash et al. | |
| 2004/0089711 A1 | 5/2004 | Sandru | |
| 2004/0098385 A1 | 5/2004 | Mayfield et al. | |
| 2004/0117302 A1* | 6/2004 | Weichert et al. | 705/40 |
| 2005/0137951 A1 | 6/2005 | Michelassi et al. | |
| 2005/0137982 A1 | 6/2005 | Michelassi et al. | |
| 2005/0149440 A1 | 7/2005 | Michelassi et al. | |
| 2007/0000994 A1 | 1/2007 | Michelassi | |

FOREIGN PATENT DOCUMENTS

| | | |
|---|---|---|
| WO | WO 03/042790 A2 | 5/2003 |
| WO | WO 03/083751 A1 | 10/2003 |

OTHER PUBLICATIONS

Office Action of Feb. 26, 2007 received from USPTO for U.S. Appl. No. 11/513,795.
Response to Office Action of Feb. 26, 2007 received from USPTO for U.S. Appl. No. 11/513,795.
Notice of Allowance of Jul. 2, 2007 received from USPTO for U.S. Appl. No. 11/513,795.
Request for Continued Examination filed Oct. 1, 2007 for U.S. Appl. No. 11/513,795.
Office Action of Sep. 21, 2005 received from USPTO for U.S. Appl. No. 10/745,464.
Response to Office Action of Sep. 21, 2005 received from USPTO for U.S. Appl. No. 10/745,464.
Notice of Allowability for U.S. Appl. No. 10/745,464, dated Apr. 14, 2006.
Office Action of Nov. 7, 2005 received from USPTO for U.S. Appl. No. 10/744,914.
Response to Office Action of Nov. 7, 2005 received from USPTO for U.S. Appl. No. 10/744,914.
Office Action of Apr. 17, 2006 received from USPTO for U.S. Appl. No. 10/744,914.
RCE & Response to Office Action of Apr. 17, 2006 received from USPTO for U.S. Appl. No. 10/744,914.
Office Action of Nov. 2, 2006 received from USPTO for U.S. Appl. No. 10/744,914.
Response to Office Action of Nov. 2, 2006 received from USPTO for U.S. Appl. No. 10/744,914.
Office Action of Jun. 15, 2007 received from USPTO for U.S. Appl. No. 10/744,914.
Response to Office Action of Jun. 15, 2007 received from USPTO for U.S. Appl. No. 10/744,914.
Request for Continued Examination to Office Action of Jun. 15, 2007 received from USPTO for U.S. Appl. No. 10/744,914.
Notice of Allowance received from USPTO for U.S. Appl. No. 11/513,795.
Disclosure Statement Under 37 C.F.R. § 1.56 for U.S. Appl. No. 10/744,706.
Non-Final Office Action dated Mar. 21, 2008 for U.S. Appl. No. 10/744,914.
Final Office Action dated Aug. 26, 2008 for U.S. Appl. No. 10/744,914.
Non-Final Office Action dated Dec. 16, 2008 for U.S. Appl. No. 10/744,914.
Non-Final Office Action dated Feb. 1, 2008 for U.S. Appl. No. 10/744,957.
Final Office Action dated Oct. 29, 2008 for U.S. Appl. No. 10/744,957.
Non-Final Office Action dated Apr. 13, 2009 for U.S. Appl. No. 10/744,957.
Disclosure Statement Under 37 CFR 1.56 dated Sep. 10, 2009.

* cited by examiner

200

| CHECK NO. [211] | ISSUE DATE [212] | AMOUNT [213] | PAYEE NAME [214] | STATUS [215] | • • • |
|---|---|---|---|---|---|
|  |  |  |  |  |  |

| PAYOR NAME [208] | BANK NO. [209] | ACCOUNT NO. [210] | CHECK NO. [211] | ISSUE DATE [212] | AMOUNT [213] | PAYEE NAME [214] | STATUS [215] | • • • |
|---|---|---|---|---|---|---|---|---|
|  |  |  |  |  |  |  |  |  |

*FIG. 2B*

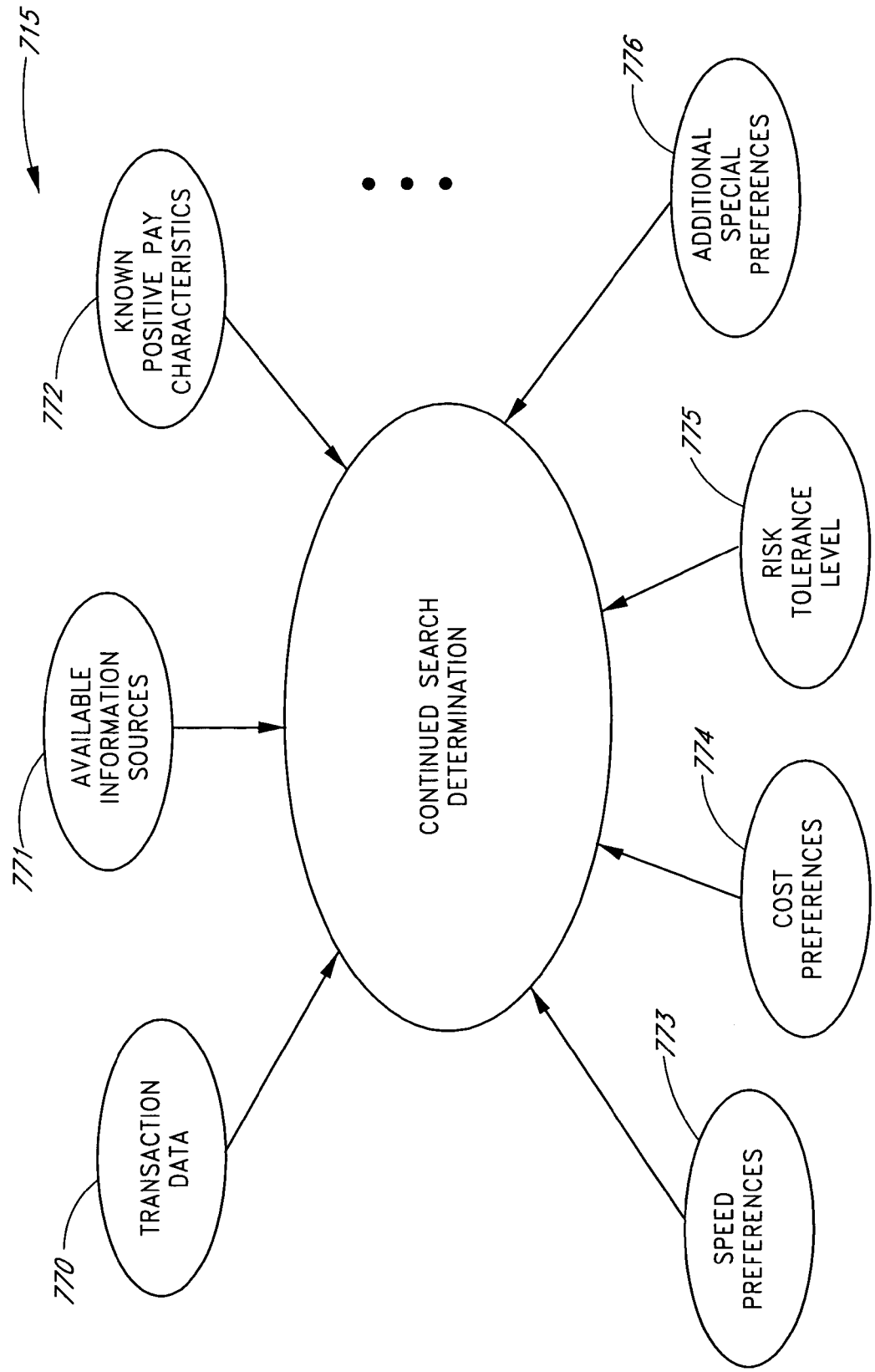

SYSTEMS AND METHODS FOR ACCESSING RECONCILEMENT INFORMATION

BACKGROUND OF THE INVENTION

1. Field of the Invention

This invention relates generally to data authentication, and, more particularly, to systems and methods for authentication of financial instruments.

2. Description of the Related Art

Checks continue to be a popular medium of financial exchange. Many individuals who are issued checks from second parties, such as paychecks from their employers, prefer to cash the checks rather than to deposit them in a bank account before withdrawing the funds. For example, many people prefer to cash their paychecks at a grocery store or check-cashing establishment. Furthermore, individuals who do not have bank accounts in which to deposit checks often depend on cashing their paychecks, government checks, and other checks at such establishments.

Businesses that cash checks for their customers take a risk that if they agree to cash a given check, they may be unsuccessful themselves in attempting to settle the check with the issuing bank. Forged checks, stolen checks, checks that have been fraudulently altered, and checks written on accounts with insufficient funds or on accounts that have been closed all contribute to losses sustained by entities that agree to accept checks for cashing. Some check-cashing entities now charge increased fees for their check-cashing services in order to compensate for losses due to the acceptance of fraudulent checks.

A check that is written by one party for cashing by another party is often known as a "second-party check." For example, a payroll check issued by an employer to an employee and presented by the employee for cashing at a grocery store may be classified as a second-party check. Businesses that cash second-party checks face extra difficulties in determining whether to accept a check presented to them for cashing because, in addition to assessing the identity and trustworthiness of the check presenter, they would like to be assured that the issuer of the check, who is typically not present, is in fact willing to authorize payment of the check.

Positive pay information is information compiled by a check-issuer about checks that the check-issuer has written against the funds in an account, often comprising information about a check number, issue date, payee name, and amount associated with a check. Thus, positive pay information is similar in many respects to information that an individual may record in his or her checkbook register about checks that have been written.

Some check-issuers, especially those writing many checks, such as large employers and businesses, may make a copy of their positive pay information available to the bank that holds their check account, with the agreement that the bank is not authorized to release funds from their check account other than for payment of those checks listed on the provided positive pay file. When a check is presented to the bank for cashing, comparing information from the face of the check with information in the positive pay file helps the bank to avoid withdrawing funds from the check-issuer's account for the payment of fraudulent checks. For this and other reasons, the use of positive pay information has proven very beneficial to banks and to check-issuers.

Check-cashing entities that cash negotiable instruments of various types, such as second-party checks, may also benefit from access to positive pay information for checks that have been presented to them for cashing. Accessing a positive pay file associated with a second-party check that has been presented for cashing is one method for checking on the authenticity of the check before making a decision to accept the check for cashing. Finding a record in the positive pay file indicating that information from the presented check matches a check listing that is authorized by the check-issuer may serve to increase confidence in the legitimacy and "cashability" of the check. Finding a record in the positive pay file indicating that the same check has already been paid may serve to increase suspicion in the fraudulent nature of the check and may decrease confidence in the "cashability" of the check. Thus, access to relevant positive pay information may help check-cashing entities more accurately assess the risk of proposed check-cashing transactions.

However, while a bank may relatively easily access positive pay information for checks from a given account before disbursing funds from that account because the desired positive pay information is typically in the bank's own possession, check-cashing entities that wish to use positive pay information to help them assess risk associated with proposed check-cashing transactions rely on positive pay information from a wide variety of check issuers, either directly or via a third-party.

Accessing information from a variety positive pay information sources may be associated with a variety of differing costs in terms of time, money, computer resources, and the like. Furthermore, various positive pay information sources may provide positive pay data that differs in the degree to which it is kept up-to-date.

At the same time, various check-cashing entities may have differing business preferences and priorities. For example, check-cashing entities may differ with respect to the level of confidence that they desire in the degree to which accessed positive pay information is up-to-date. Check-cashing entities may differ in the amount of resources that they are willing to expend for positive pay information associated with a desired level of confidence. Furthermore, a given check-cashing entity may desire a higher level of confidence in positive pay information for a high dollar-value check issued by an unfamiliar check-issuer than it would for a lower dollar-value check issued by a local employer and presented for cashing each payday.

For some presented checks, it may be easy to identify and to access a single positive pay information source that stores the desired positive pay information. When no single, definitive source of positive pay information for a presented check is known, the check-cashing entity, or the third-party check authentication service working on its behalf, may be configured to access and to query a plurality of positive pay information sources in a search for the desired positive pay information.

While an exhaustive querying of available positive pay information sources may provide a comprehensive survey of available information and a high level of confidence in the completeness of the information obtained, given a large number of information sources and the possible existence of constraints on time or other resources for carrying out a set of queries, an exhaustive search of available positive pay information sources may consume an amount of system resources that is unwarranted and undesired by the check-cashing entity. At the same time, a search limited to only one or a few of the available positive pay information sources may fail to locate existing, desired positive pay information for the check in question that may have been located if the search had been extended even a little.

SUMMARY OF THE INVENTION

Systems and methods are disclosed for implementing a universal check authentication system that allows a check-cashing entity to transmit requests for authentication of checks and other negotiable instruments issued by a variety of issuers that have been presented to the check-cashing entity for cashing or other form of acceptance. The universal check authentication system accepts information about the proposed check-cashing transaction and uses the information to access an appropriate source of authentication for the check or other negotiable instrument. In various embodiments, the check authentication system obtains positive pay information from a variety of sources and accesses positive pay information associated with a presented check in response to an authentication request.

For example, systems and methods are disclosed for selectively extending a search for positive pay information about a given check from amongst a set of available positive pay information sources. Thus, a search for positive pay information carried out on behalf of a check-cashing entity that has been presented with a check for cashing may be customized to suit the check-cashing entity's preferences with regard to the proposed check-cashing transaction at hand.

In various embodiments, positive pay information provides a listing of information about checks that a check-issuer has issued and may comprise information about checks that have already been accepted for cashing. Positive pay information and other reconcilement information for other types of negotiable instruments may provide information useful for determining whether a given instrument is authorized for at least one of: cashing, deposit, exchange, and other type of acceptance.

A check authentication system may carry out a search for positive pay information associated with a given check on behalf of a check cashing entity to whom the check has been presented for cashing. Positive pay information for the check may provide an indication as to whether the check is legitimate and the check-issuer is willing to honor the check. Thus, obtaining positive pay information for the check may assist the check-cashing entity to assess a level of risk associated with the proposed check-cashing transaction and to reduce the acceptance of fraudulent checks.

When a single, definitive source of positive pay information for a presented check is not readily identifiable, a plurality of positive pay information sources may be accessed in an attempt to locate the desired positive pay information. In various embodiments, when a plurality of potentially useful sources of reconcilement information are identified for querying in association with a proposed check-cashing transaction, a decision regarding how many of the sources to query and/or how long to continue to query may be based at least in part on factors relating to the transaction, factors relating to characteristics of the information sources, and factors relating to preferences on the part of the check-cashing entity.

Factors relating to the proposed check-cashing transaction may comprise, for example, data about a check amount, check type, issue date, payee name, check-cashing entity type and location, and the like. Factors relating to available positive pay information sources may comprise, for example, data about fees or other monetary costs associated with accessing information from the sources, data about average response times for positive pay queries sent to the sources, data about check-issuers whose positive pay information is made available from the sources, data about how up-to-date information available from the sources is kept, and the like. Factors relating to preferences of the check-cashing entity may comprise, for example, agreements between the check-cashing entity and the check authentication system regarding an amount of time to be allotted for a given positive pay information search, an amount of money to be spent on a given positive pay information search, and a level of risk regarding accepting checks for cashing that is acceptable to the check cashing entity, and other special considerations.

Taking these or other desirable factors into account, the check authentication system determines to what extent to continue a search for positive pay information in association with a proposed check-cashing transaction.

An embodiment of a process is described for determining whether to access additional positive pay information in association with a proposed check-cashing transaction. The process comprises the acts of: receiving a request from a check-cashing entity for positive pay status information for a check presented in association with a proposed check-cashing transaction; identifying at least one source of positive pay information; accessing positive pay information from at least said one of the positive pay information sources; storing the accessed positive pay information; accessing additional information about at least one of the set consisting of: characteristics of the proposed check-cashing transaction, characteristics of the identified positive pay information sources, and preferences of the check-cashing entity; and determining whether to access additional positive pay information, based at least in part on at least one of the set consisting of: the accessed positive pay information and the accessed additional information.

An embodiment of check authentication system is described that comprises a data interface which is configured to receive a request from a check-cashing entity for positive pay authentication in association with a proposed check-cashing transaction, wherein the request comprises information about characteristics of the proposed check-cashing transaction. The embodiment of the check authentication system further comprises a computer-accessible storage medium that is configured to store additional information about characteristics of one or more positive pay information sources and information about preferences expressed by the check-cashing entity. The embodiment of the check authentication system further comprises a processor that is configured to query at least one positive pay information source for positive pay information associated with the proposed check-cashing transaction. The processor is further configured to determine thereafter whether to query at least one additional positive pay information source, based at least in part on at least one of the set consisting of: the information about characteristics of the proposed check-cashing transaction, at least one positive pay authentication status report received in response to a query, and the stored additional information.

An embodiment of a check authentication system is described that comprises a processor which is configured to query at least one source for reconcilement information associated with a proposed financial transaction. The processor is further configured to determine whether to query additional sources based at least in part on at least one of the set consisting of: information about the proposed financial transaction, information about available sources, and information about preferences on the part of a check-cashing entity associated with the proposed financial transaction.

An embodiment of a method is described for providing an authentication status result for a negotiable instrument. The embodiment of the method comprises the acts of: querying a source of reconcilement information for authentication information about a negotiable instrument; determining in a programmed processor whether additional reconcilement information is desirable for assessing an authentication status result for the negotiable instrument; continuing to query at least one additional source of reconcilement information as long as additional reconcilement information is desirable; assessing in a programmed processor an authentication status result for the negotiable instrument, based at least in part on the authentication information; and providing the authentication status result to a party requesting the authentication status result.

An embodiment of a point-of-sale device is described. The embodiment of the point-of-sale device comprises an input system that is configured to obtain information associated with a proposed check-cashing transaction, wherein the input system is located at a check-cashing entity. The embodiment of the point-of-sale device further comprises a communications system that is in communication with the input system. The communications system is configured to transmit at least some of the information obtained by the input system to a remote system in association with a request for the remote system to access positive pay information associated with the proposed transaction and for the purpose of enabling the remote system to determine whether to access at least one additional positive pay information source after accessing at least one positive pay information source.

An embodiment of a method of assisting in positive pay authentications is described. The embodiment of the method comprises sending data to a check authentication system for the purpose of enabling the check authentication system to determine whether to continue querying positive pay information sources in search of positive pay information associated with a proposed check-cashing transaction.

An embodiment of a process for reducing risk associated with accepting a check offered at a check-cashing transaction is described. The embodiment of the process comprises the acts of entering into an agreement with a check authentication system in which the check authentication system agrees to perform positive pay check authentications and informing the check authentication system of preferences associated with positive pay check authentications. The embodiment of the process further comprises the acts of: transmitting information associated with a positive pay authentication request for a proposed check-cashing transaction to the check authentication system; receiving from the check authentication system data indicative of a positive pay authentication result that is based at least in part on information obtained from at least one positive pay information source that is selected based at least in part on the transmitted information associated with the proposed check-cashing transaction and on the preferences associated with positive pay authentications; and determining whether to accept the check offered at the proposed check-cashing transaction, based at least in part on the positive pay authentication result.

An embodiment of a check-cashing entity is described, wherein the check-cashing entity is configured to transmit to a check authentication system information associated with a proposed check-cashing transaction. The check-cashing entity is further configured to transmit preferences regarding positive pay authentications to be carried out by the check authentication system. The information and the preferences enable the check authentication system to determine, after querying at least one source of positive pay information, whether to query at least one additional source of positive pay information.

An embodiment of a method for obtaining positive pay information associated with a proposed check-cashing transaction is described. The embodiment of the method comprises the act of: providing a check authentication system with information about preferences regarding positive pay information searches performed by the check authentication system, wherein the provided information enables the check authentication system to determine whether to continue querying positive pay information sources in searches for positive pay information that are associated with proposed check-cashing transactions. The embodiment of the method further comprises transmitting a request to the check authentication system for positive pay information associated with a proposed check-cashing transaction, wherein the transmitted request triggers the check authentication system to query a positive pay information source for positive pay information associated with the proposed check-cashing transaction and wherein, the transmitted request thereafter triggers a determination about whether to continue querying positive pay information sources in a search for positive pay information associated with the proposed check-cashing transaction. The embodiment of the method further comprises obtaining from the check authentication system positive pay information associated with the proposed check-cashing transaction.

An embodiment of a positive pay information source is described that provides to a check authentication system information useful for assisting the authentication system in a determining whether to continue querying positive pay information sources in association with a positive pay authentication of a check.

An embodiment of a reconcilement information source is described, which comprises a computer-accessible storage medium configured to store reconcilement information abut negotiable instruments, and a communications system that is configured to transmit data about the reconcilement information source to a remote system that conducts searches for reconcilement information. The communications system transmits the data to assist the remote system to determine whether to continue querying reconcilement information sources in a search for reconcilement information.

An embodiment of a process for participating in a positive pay authentication is described, that comprises providing data to a remote system about a positive pay information source to assist the remote system to determine whether to continue a search for positive pay information in association with a request for positive pay authentication.

An embodiment of a system for determining whether to continue a search for positive pay information is described. The embodiment of the system comprises: means for receiving a request from a check-cashing entity for positive pay status information for a check presented in association with a proposed check-cashing transaction; means for identifying at least one source of positive pay information; means for accessing positive pay information from at least one of the identified sources; means for accessing additional information about at least one of the set consisting of: characteristics of the proposed check-cashing transaction, characteristics of the identified positive pay information sources, and preferences of the check-cashing entity; and means for determining whether to access additional positive pay information, based at least in part on at least one of the set consisting of: the accessed positive pay information and the accessed additional information.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

FIG. 2A depicts a first embodiment of a table of positive pay information.

FIG. 2B depicts a second embodiment of a table of positive pay information.

FIG. 7C is a diagram depicting exemplary factors that may influence a process to determine when to continue a search for positive pay information in association with authentication of a presented check.

DETAILED DESCRIPTION OF THE EMBODIMENTS

Figure 1:
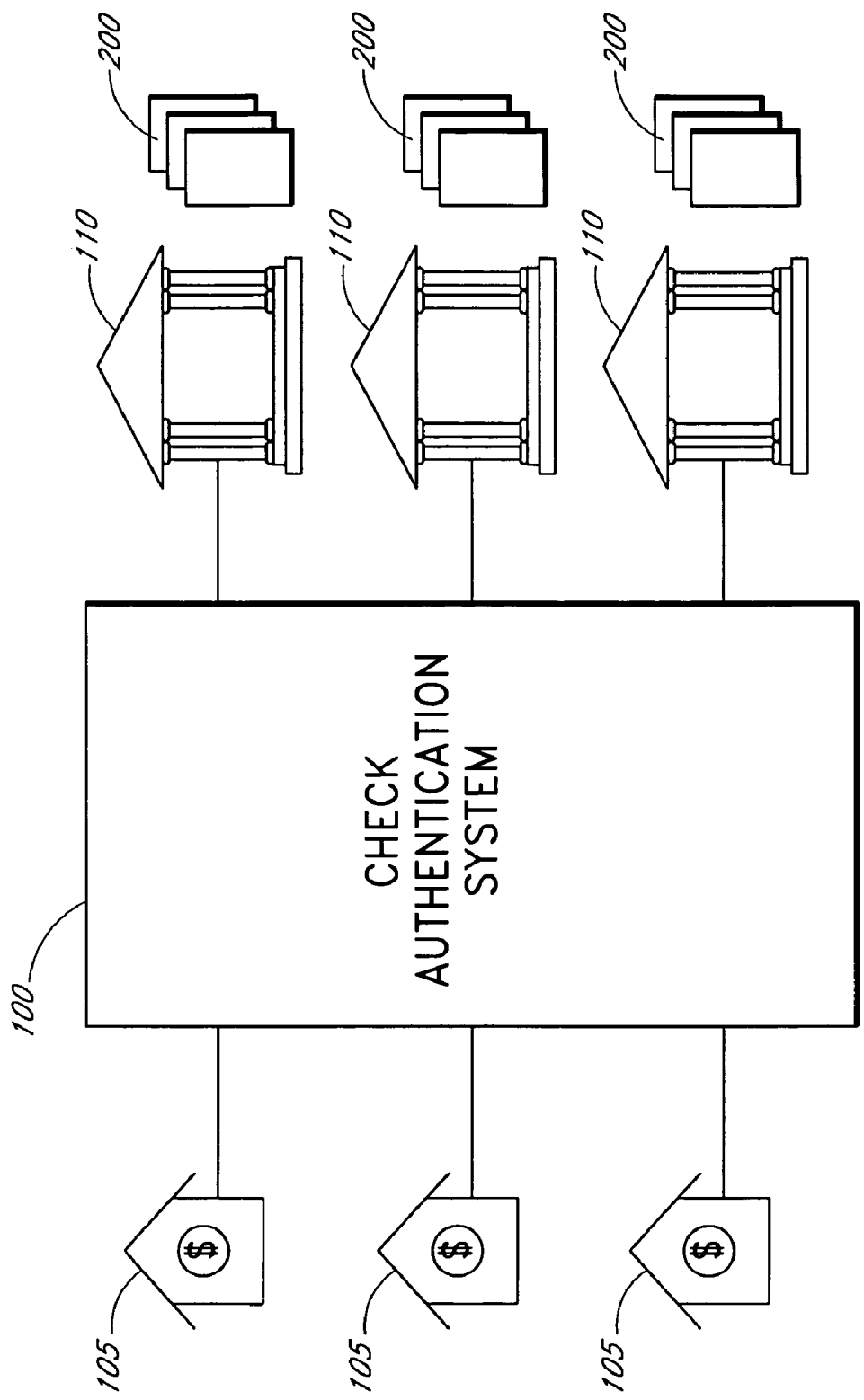
FIG. 1 is a high-level block diagram depicting one embodiment of a centralized check authentication system.

Check fraud is a severe problem within the check-cashing and payday loan industries. Various features of the invention provide entities that cash checks, such as grocery stores, convenience stores, and check-cashing businesses, with systems and methods for approving a greater portion of legitimate proposed check-cashing transactions without incurring a corresponding increase of returned checks or fraud.

One difficulty with accepting checks for cashing is that often checks presented for cashing, such as payroll checks, are second-party checks. Second-party checks generally refer to checks that are issued by a first party, sometimes known as a payor, to a second party, sometimes known as a payee, and that are presented by the payee for cashing, for purchasing, for deposit, for other exchange, for a combination of some or all of the foregoing, or form some other form of acceptance.

Since a second-party check is written by someone other than the person presenting the check for cashing, a check-cashing entity often desires to be assured, not only that the check presenter is trustworthy and is being accurately identified, but also that the check is authentic, namely, that the presenter is the intended payee of the check and that the check is legitimate and is likely to be successfully settled by payor's bank.

Such authentication of the check item may be carried out using a number of different systems and methods. For example, special marks, codes, or other indicia that have been imprinted, embedded, or encoded on the check may provide a level of confidence that a check is authentic. As another example, positive pay information may sometimes be used to authenticate a check presented for cashing.

Positive pay information, when made available by a given check-issuer, comprises information about checks that the check-issuer has written, in much the same way that an individual's check register lists information about checks that the individual has written from a given account. Thus, in various embodiments, positive pay information for a given check may comprise at least one of: a payee name, an amount, and issue date, an identifier for the check, and a status code, such as an indication as to whether the check has already been paid.

A check-issuer who compiles a file of positive pay information may frequently make the positive pay information file available to the bank that holds his or her checking account, with the agreement that only checks listed in the file are authorized for payment. When the bank subsequently receives a request to settle a check that is presented as being issued from the account, the bank may compare information from the check with the file of positive pay information received from the check-issuer in order to determine if the presented check is authorized for payment. Thus, consulting the positive pay information file helps the bank to avoid withdrawing funds from the check-issuer's account for payment of fraudulent checks.

When positive pay information is also made available to check-cashing entities, the check-cashing entities may use the positive pay information to help reduce their incidence of accepting fraudulent second-party checks for cashing. Checks that can be verified using positive pay information are often perceived as posing less risk to the check-cashing entity and may thus be more frequently accepted when presented for cashing. This increased acceptability of checks may be especially advantageous to payees who do not have bank accounts and who want to cash their checks, including their payroll checks, at check-cashing entities.

However, although banks and check-issuers may be willing to make positive pay information available to check-cashing entities in order to further reduce exposure to fraudulent check cashing attempts, a check-cashing entity may lack the resources to individually locate and contact an appropriate source of positive pay information for each check presented to them for cashing. For example, a check-cashing entity may lack the resources to identify the appropriate source of positive pay information for a given check, may lack the communications resources to contact the information source in a timely manner, may find it cumbersome to deal with positive pay information accessed according to a variety of different protocols and stored in a variety of different formats, and/or may not wish to establish and maintain relationships with the wide variety of positive pay information sources that may be relevant to checks that it may receive. Thus, as methods for check fraud continue to become more sophisticated, authenticating checks using positive pay information becomes an increasingly complex task that may tax the resources of check-cashing entities.

A centralized check authentication system that oversees and manages authentication for checks and other negotiable instruments on behalf of check-cashing entities is described. In particular, a check authentication system that provides access to desired positive pay information or other reconcilement information for check-cashing entities is described. In conjunction with the described check authentication system, a check-cashing entity is able to receive positive pay information for checks and other negotiable instruments from multiple issuers and from multiple other sources of positive pay information by accessing a single check authentication system.

As will be apparent to one of ordinary skill in the art, many of the disclosed features may be used without others, and may be implemented differently than described herein. For example, although described primarily in the context of a face-to-face check-cashing environment for second-party checks, the various inventive features are also useful in other situations in which an entity accepts an unknown financial instrument as payment for goods and/or services, or for deposit, cashing, or exchange.

For example, many of the disclosed features may apply to other types of checks and negotiable instruments, such as, but not limited to: third-party checks, other personal checks, corporate checks, payroll checks, convenience checks, company insurance refund checks, tax refund checks, Social Security checks, other government-issued checks, traveler's checks, bank checks, official checks, convenience checks, money orders, and other value-carrying papers, or other types of cashable financial instrument, such as check cards, traveler's check cards, payroll cards, government-issued payment cards, and the like. It is to be understood that the use of the term "check" in the context of this disclosure may refer to any of the above or other types of negotiable instrument.

In association with some of the aforementioned types of negotiable instruments, it may not be customary to use the term "positive pay" to describe reconcilement information. As used herein, reconcilement information comprises information that is descriptive of issued negotiable instruments and of one or more of their characteristics so as to be useful in authenticating the legitimacy of the instruments. Thus, although described in terms of checks being cashed and being authenticated by referring to positive pay information, the systems and methods described herein are contemplated as being applicable and useful for various forms of reconcilement information associated with various forms of negotiable instruments being presented for acceptance for various types of transactions.

Furthermore, although described with respect to an "individual" presenting a check for cashing, the systems and methods may apply to a group or other entity wishing to cash a financial instrument. The systems and methods may also apply to transactions executed in part or in their entirety using a communications network such as the Internet, or other system configured to facilitate financial transactions. The following description is thus intended to illustrate, and not to limit the claimed systems and methods.

FIG. 1 is a high-level block diagram depicting one embodiment of a centralized system for check authentication. As shown in FIG. 1, one or more check-cashing entities 105 are configured to communicate with a remote check authentication system 100 that communicates with one or more sources of positive pay information 110, which may be local or remote. The check-cashing entity 105 communicates with the check authentication system 100 to request authentication services in connection with a check or other negotiable instrument that is presented to the check-cashing entity 105 for cashing, for deposit, in exchange for goods or services, or for a combination of the foregoing reasons.

A check-cashing entity 105 may be, for example, a grocery store, convenience store, specialized check-cashing business, or other retail or merchant facility that wishes to provide second-party or other check-cashing services to its customers. In other embodiments, the check-cashing entity may be a pawnshop, resort, casino, or other establishment that wishes to make cashing checks convenient for its patrons. In still other embodiments, the check-cashing entity 105 may be a financial institution or non-bank financial institution (NBFI) such as a specialized business that offers check-cashing or money exchange services to individuals wishing to cash checks, possibly along with related services such as payday loans, local and overseas money wiring, and the like. In some embodiments, the check-cashing entity 105 may be a kiosk, stand, or other manned or unmanned location configured to provide check-cashing services. In yet other embodiments, the check-cashing entity 105 may be one or more individuals offering to accept checks and/or other negotiable instruments for cashing, deposit, purchase, exchange, or other forms of acceptance. Furthermore, the check-cashing entity 105 may be operated as a website, Internet-based enterprise, or other remote communications network that accepts checks and/or other negotiable instruments for cashing, deposit, purchase, exchange, or other forms of acceptance.

In one embodiment, the check-cashing entity 105 communicates with the check authentication system 100 using a dial-up communications medium or other suitable medium for accessing the Internet or other network of computers. In other embodiments, the check-cashing entity 105 communicates with the check authentication system 100 using a communications medium that may comprise, by way of example, a Virtual Private Network (VPN), dedicated communication lines such as T1 or frame relay for host-to-host connection, or other combination of telephone networks, wireless data transmission systems, two-way cable systems, customized computer networks, interactive kiosk networks, automatic teller machine networks, interactive television networks, and the like. In other embodiments, the check-cashing entity 105 communicates with the check authentication system 100 using other technologies.

In the embodiment shown in FIG. 1, the check-cashing entity 105 requests authentication of the check from the check authentication system 100, based at least in part on positive pay information for the presented check. Positive pay information provides a useful indication as to the likelihood of a presented check being honored by the check-issuer. The check-cashing entity 105 may present its check authentication requests to the centralized check authentication system 100, without interacting directly with the actual source 110 of the positive pay information. If the check authentication system 100 replies that the positive pay information associated with the check indicates that the check is legitimate and cashable, the check-cashing entity 105 may accept the check and may pay an equivalent amount of cash, minus any fees associated with the transaction, to an individual who is presenting the check.

In some embodiments, the check authentication system 100 may operate as one or more components of a larger system that provides additional check-related services. For example, the check authentication system 100 may be part of a system that provides risk assessment services for check-related transactions. In some embodiments, positive pay information or other authentication information retrieved by the check authentication system 100 may be used to determine a positive-pay related risk score that may be used in turn to assign a risk score to the transaction. In some embodiments, the check authentication system 100 may be part of a system that provides other additional services for check-cashing transactions, such as guaranteeing checks, purchasing unsettled checks, presenting checks for settlement and/or providing collection services for returned checks. For ease of description, however, and in order to focus on novel aspects of the systems and methods disclosed, the check authentication system 100 will be described henceforth without such additional check-related services.

In one embodiment, when a check is presented for cashing, information is extracted from the face of the check using at least one of: electronic or magnetic imaging, scanning, optical character recognition, magnetic stripe reading, other card-scanning technologies, visual inspection, and other data input technologies. The extracted information may be used to access associated information in a positive pay file 200, as will be described in greater detail in the remainder of this disclosure. Once an associated positive pay record is located for the presented check, if such a record is found to exist, information stored in the positive pay record may be compared with information extracted from the face of the check and, in some embodiments, with information from other sources associated with the proposed check-cashing transaction. Comparing information from the presented check with information from the positive pay file 200 may enhance confidence that the presented check is a bona-fide, unaltered, cashable check.

In the embodiment depicted in FIG. 1, the check authentication system 100 communicates with one or more sources of positive pay information 110, and authenticates checks based at least in part on information stored in positive pay files 200 available from the positive pay information sources 110. The positive pay information sources 110 may, in various embodiments, be check-issuer such as employers, may be banks or other financial institutions that manage accounts for the check-issuers, may be payroll processors, or may be other third-party providers of positive pay information. A positive pay information source 110 may provide access to positive pay files 200 that it maintains for accounts that it owns or manages, or for accounts for which it has negotiated access to positive pay information.

In one embodiment, the check authentication system 100 communicates with the remote positive pay information source 110 using a communications systems such as a dial-up communications medium or other suitable medium for accessing the Internet or other network of computers. In other embodiments, the check authentication system 100 communicates with the positive pay information source 110 using a communications medium that may comprise, by way of example, a Virtual Private Network (VPN), dedicated communication lines such as T1 or frame relay for host-to-host connection, or other combination of telephone networks, wireless data transmission systems, two-way cable systems, customized computer networks, interactive kiosk networks, automatic teller machine networks, interactive television networks, and the like. In other embodiments, the check authentication system 100 communicates with the positive pay information source 110 using other communications system technologies.

As depicted in FIG. 1, in some embodiments, the check authentication system 100 communicates with positive pay information sources 110 to access information from positive pay files 200 that are stored externally, such as positive pay information made available directly from a check-issuer, the check-issuer's bank, or a third-party such as payroll processor or other positive pay information service provider.

In some embodiments, the check authentication system 100 obtains copies of positive pay files 200 from one or more check-issuers and other sources of positive pay information 110, including, but not limited to, employers, payroll processors, government entities, and the like, and stores the positive pay files 200 internally for quick access during authentication requests associated with check-cashing transactions. In various embodiments, the internal copy of the positive pay file 200 stored at the check authentication system 100 is kept current with updates.

Whether positive pay information is maintained internally or externally to the check authentication system 100, or as a combination of the two, the check authentication system 100 benefits from an ability to quickly and accurately access positive pay information from disparate sources.

With respect to a variety of different components associated with the check authentication system 100 and described herein, the components may be embodied as computer program logic configured to execute on one or more computer processors. In one embodiment, the program logic may advantageously be implemented as one or more modules. The modules may comprise, but are not limited to, any of the following: software or hardware components such as object-oriented components, class components, task components, processes methods, functions, attributes, procedures, subroutines, segments of program code, drivers, firmware, microcode, circuitry, data, databases, data structures, tables, arrays, or variables.

The one or more computer processors associated with the check authentication system 100 may comprise, by way of example, personal computers (PCs), mainframe computers, other processors, program logic, or other substrate configurations representing data and instructions, which operate as described herein. In other embodiments, the processors may comprise controller circuitry, processor circuitry, processors, general purpose single-chip or multi-chip microprocessors, digital signal processors, embedded microprocessors, microcontrollers and the like.

The check authentication system 100 may be one component of a more comprehensive business entity that offers services related to risk management and/or transaction handling for check-related or other financial transactions. The check authentication system 100 may also be implemented as computer software on a computer operated by the check authentication system 100 or the check-cashing entity 105, or on a server for a networked group of check-cashing entities 105, such as a chain of check-cashing stores, or as a centralized system that provides services to entities who subscribe to their services, or in some other suitably configured manner.

FIGS. 2A and 2B depict two embodiments of repositories that store positive pay information on a computer-accessible storage medium. The repositories are depicted here in the form of tables, sometimes known as positive pay lists or positive pay files 200. In both FIG. 2A and FIG. 2B, the positive pay files 200 comprise records of information about checks. In various embodiments, a record of the positive pay file 200 corresponds to a check written by a check-issuer to be drawn against funds in a given bank account or other source of funds.

As was described in greater detail above, a check-issuer, such as an individual or an employer, may make positive pay information about checks that it has issued available to its bank and/or to other parties. Using positive pay information from the check-issuer, the bank may more easily identify checks that are counterfeit, fraudulently altered, stolen, voided, already paid, subject to a stop-payment order, or are otherwise not intended to be paid by the check-issuer. The bank may thus avoid accepting an unauthorized check and withdrawing funds from the check-issuer's account to settle such checks. Furthermore, when positive pay files 200 are made available to check-cashing entities 105 who are asked to cash, to deposit, or to otherwise accept second-party and other checks, the records of the positive pay file 200 comprise information that may similarly aid the check-cashing entities 105 in distinguishing between checks that the check-issuer authorizes for payment, and will thus likely be honored by the check-issuer, and checks that are not authorized to be paid.

Although the examples provided in FIGS. 2A and 2B illustrate positive pay information for checks, it will be familiar to one of ordinary skill in the art that positive pay or other reconcilement information for other types of negotiable instruments or promissory payments may be additionally or alternatively be accessed by the check authentication system 100 for providing authentication information to check-cashing entities 105. For example, a provider of traveler's checks and/or traveler's check cards may make available a file of information comprising identifiers for purchased traveler's checks, amounts of the purchased traveler's checks, names and/or other identifiers for purchasers of the traveler's checks, as well as other information, such as, for example, date and location of purchase and/or cashing. Similarly, files of reconcilement information may be kept for issued money orders, official checks, various types of government and corporate checks, and the like, which may be issued in paper, electronic, card, or other formats.

FIG. 2A depicts one embodiment of a positive pay file 200 that may be used to store information from a single check-issuer about checks issued from a single checking account. As depicted in FIG. 2A, the positive pay file 200 comprises records organized as a set of fields. In FIG. 2A, a record comprises a check number field 211, an issue date field 212, an amount field 213, a payee name field 214, and a status field 215.

The check number field 211 stores an identification number, sometimes known as a sequence number, for a check or other financial instrument associated with the record. In the embodiment shown in FIG. 2A, a search for positive pay information associated with a check presented for cashing identifies the desired positive pay record in the positive pay file 200 by locating a record with a check number field 211 value that matches a check number on the presented check. In other embodiments, one or more other fields are used as a key for locating a desired record.

The issue date field 212 stores a record of the date on which the associated check was issued, and may be useful for helping to identify a given check.

The amount field 213 stores a record of the amount for which the check was written. Comparing the value in the amount field 213 with an amount written on the face of the presented check enhances a check-cashing entity's 105 ability to detect checks whose amount information has been altered fraudulently.

The payee name field 214 lists the name of the person or entity to whom the check was issued and may be compared to a payee name written on the presented check, thereby enhancing the check-cashing entity's 105 ability to detect a check with an altered payee notation. Furthermore, in one embodiment, information in the payee field 214 may be compared to information obtained from a driver's license or other source of identification information available for the check presenter. In various embodiments, additional fields comprising identifying information for the payee may also be stored in the positive pay file 200 record. For example, address information for the payee may be stored for comparison to an address offered by the check presenter. Similarly, a Social Security number, employee identification number, or other identifier for the payee may be stored in the positive pay file 200 record and may be used to enhance verification that the check presenter is the intended payee of the check.

The embodiment of the positive pay file 200 depicted in FIG. 2A further comprises a status field 215. In some embodiments, the status field 215 comprises information about a current status associated with the check or about activity relevant to the check that occurs after the check is issued. For example, in one embodiment, the status field 215 may store a notation such as AUTH to indicate that the check associated with the record is authorized for cashing. The status field 215 may store a notation such as PAID to indicate that the check associated with the record has already been paid and should not be authorized for cashing. The status field 215 may store a notation such as VOID or STOLEN or STOP to indicate that the check associated with the record has been, respectively, voided, stolen, or that the bank has been instructed to stop payment on the check, and that the check is thus not authorized for cashing.

In other embodiments, other codes, formats, and/or systems of categorization may be used to express status information about the check associated with the record. For example, in some embodiments, the status field 215 may store one of two notations, such as PAID and UNPAID, which in some embodiments may be implemented as a single binary bit within the positive pay record. As another example, a positive pay information source 110 may maintain its positive pay files 200 as lists of checks that are currently authorized for payment. In such embodiments, records may be removed from the positive pay file 200 when the associated check is paid, and the status field 215 may not be needed.

In some embodiments, the status field 215 may be organized as a log pertaining to the associated check, with notations of activities and associated dates. For example, an AUTH notation in the status field 215 may be accompanied by an associated date of issuance, and subsequently a PAID notation may be added with an associated date of payment. As another example, instances when a check is presented for cashing, but is refused, based on information in the positive pay file 200 or for other reasons, may be noted in the status field 215 and may alert a system administrator to a possibility of fraudulent activity. In other embodiments, other systems may be used to provide current, useful status information for the checks described in the positive pay file 200.

The wide variety of possible systems for coding and notation of check status information may present a problem for check-cashing entities 105 to properly access and interpret directly. Check-cashing entities 105 may therefore benefit from engaging the check authentication system 100, with its typically greater processing power and more extensive network of connections with positive pay information sources 110, to serve as an intermediary for acquiring and interpreting the desired positive pay information.

FIG. 2B depicts one embodiment of a positive pay file 200 that may be used to store positive pay information compiled for multiple checking accounts at multiple banks and issued by multiple check-issuers. For example, the positive pay file 200 of FIG. 2B may describe a positive pay file 200 made available by a company that manages payroll accounts for a number of large business employers and that makes positive pay information for the large businesses available for check verification purposes. As another example, the positive pay file 200 of FIG. 2B may describe an internally stored positive pay file 200 that is compiled by the check authentication system 100 from copies of one or more positive pay files 200 received from one or more positive pay information sources 110. In other embodiments, a positive pay file 200 may comprise positive pay information from multiple check-issuer accounts at a single bank, or may comprise other sets of positive pay information.

As was the case with the embodiment shown in FIG. 2A, the positive pay file 200 depicted in FIG. 2B comprises records organized as a set of fields, and a record comprises the check number field 211, the issue date field 212, the amount field 213, the payee name field 214, and the status field 215.

In addition to the fields 211-215 described above, the positive pay file 200 depicted in FIG. 2B, which stores records for multiple check-issuers, further comprises three fields 208-210 that help to identify a bank account and check-issuer associated with a given record. As depicted in FIG. 2B, a payor name field 208 comprises a name or other identifier for a company, individual, or other entity that issued the check associated with the record. In embodiments where the positive pay file 200 comprises information about checks written by a single check-issuer or where other fields adequately identify an account, a payor field 215 may be not needed and not used.

As further depicted in FIG. 2B, a bank number field 209, which stores a bank routing number or other bank identifier, and an account number field 210 store information useful for identifying a bank account on which the presented check is to be drawn. In various embodiments, the bank number field 209, account number field 210, and check number field 211, may be read from a MICR line on the face of the presented check and may be used in combination to identify a record associated with the check.

As will be described in greater detail below, information read from the face of a presented check, such as a check amount, issue date, payee name, and the like, may be compared with information stored in an associated record in the positive pay file 200 in order to determine if the check is listed as being authorized for payment. For example, a check that is listed in the positive pay file 200 as having already been paid is typically not authorized to be paid again.

As checks are accepted for cashing, a notification may be sent to the positive pay information source 110, and an updated notation may be made in the status field 215 signifying that the item has now been paid. If the same check, or what appears to be the same check, is presented again for cashing, the notation in the status field 215 will show that the check has already been paid, implying that at least one of the checks is a copy or forgery. Similarly, a notification may be sent to the positive pay information source 110 regarding a potentially fraudulent attempt to cash the check, and an updated notation to that effect may be made in the status field 215.

FIGS. 2A and 2B depict two embodiments of data storage structures used to store positive pay information. For ease of description, the structures have been depicted and described as flat tables. As will be familiar to one of ordinary skill in the art, other configurations and methods of data storage and data retrieval may also be used without departing from the spirit of the systems and methods described herein. For example, one or more remote or local relational database systems, linked lists, or other file or data structures may be used to house the positive pay information.

Furthermore, in other embodiments, one or more different fields and/or different informational content may be used to provide positive pay, register reconcilement, or other authenticating information about the funds associated with a negotiable financial instrument. For example, other types of reconcilement information useful to a check-cashing entity 105 may be provided by government entities that issue checks and/or by issuers of traveler's checks, money orders, convenience checks, and the like.

Figure 3:
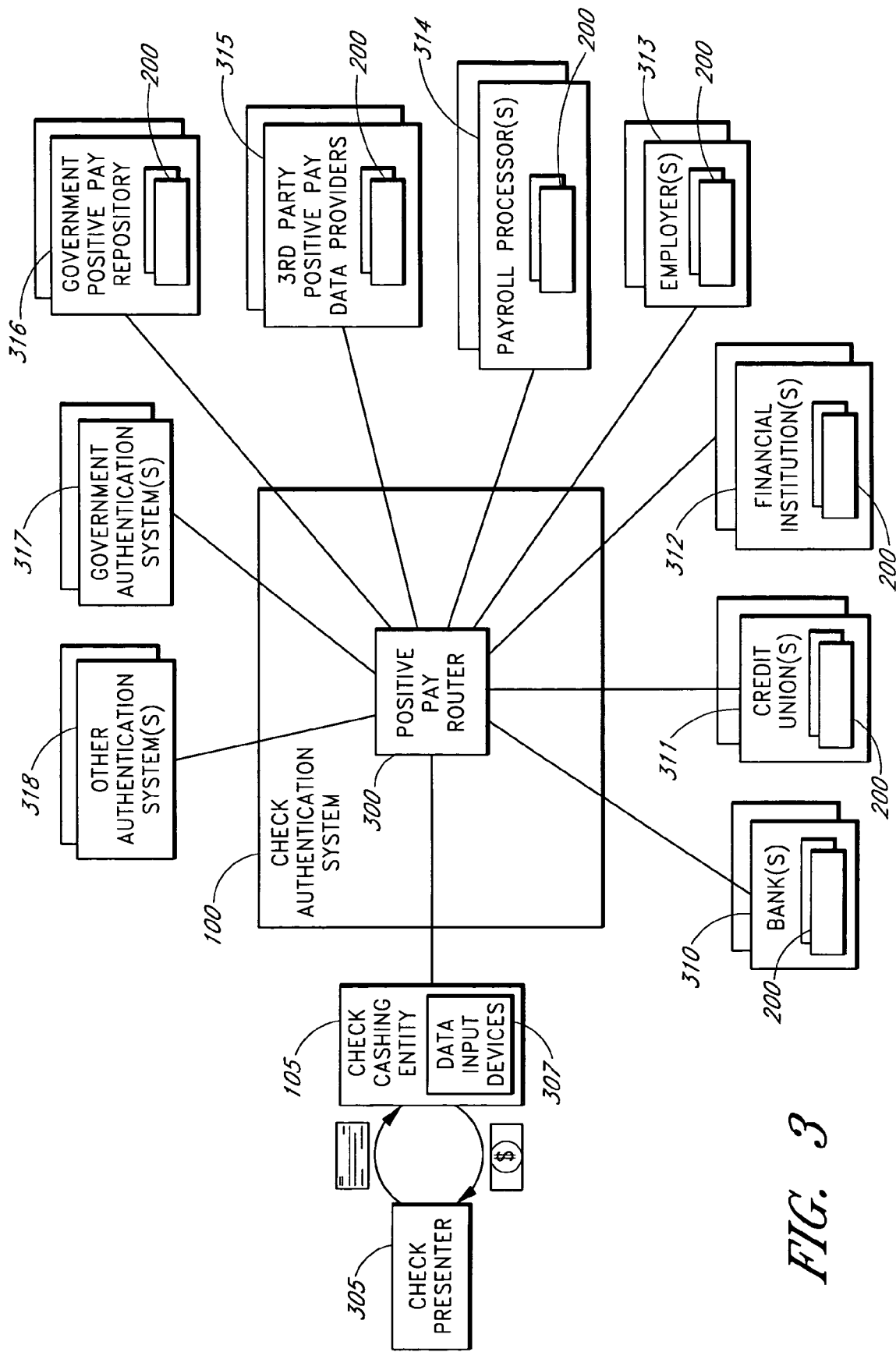
FIG. 3 is a block diagram depicting one embodiment of a check authentication system with a positive pay router.

FIG. 3 is a block diagram depicting one embodiment of a check authentication system 100 with a positive pay router 300. As depicted in FIG. 3, a check presenter 305 presents a check or other negotiable instrument to the check-cashing entity 105 for cashing, deposit, exchange, or the like. The check presenter 305 may be an individual or entity wishing to cash a check or other cashable financial instrument. For example, in one embodiment, the check presenter 305 may be an employee wishing to cash a paycheck. In other embodiments, the check presenter 305 may wish to cash or otherwise exchange a different type of check or financial instrument, such as, but not limited to: a personal check or check card, a tax refund check or other government-issued check or check card, a traveler's check or check card, bank check, official check, convenience check, money order, or other type of cashable financial instrument.

In various embodiments, the check-cashing entity 105 comprises an input system that comprises one or more data input devices 307 for inputting information about the check. For example, the data input devices 307 may comprise a check-scanning device for scanning an electronic image of the check or of another document. The data input devices 307 may comprise a device configured to read a magnetic ink character recognition (MICR) line from the face of the check or other document. The data input devices 307 may comprise a graphic device or system configured to obtain information about a watermark, barcode, insignia, security number, background pattern, reflective fibers, electronic signal, or other authenticating mark or device from a check. The data input devices 307 may comprise an input system configured to use optical character recognition (OCR) technology. The data input devices 307 may comprise an input system configured to use magnetic-stripe or other card-reading technology. The data input devices 307 may comprise a keyboard, keypad, stylus, touchscreen, or other device for manually entering data associated with the proposed check-cashing transaction. The data input devices 307 may comprise a voice recognition system, video camera, or other device for verbally entering data associated with the proposed check-cashing transaction. The data input devices 307 may comprise a device or system for obtaining other information useful for authenticating the check associated with the proposed check-cashing transaction. Furthermore, in embodiments where the check authentication system 100 is part of a system that provides more comprehensive check-related services to the check-cashing entity 105, such as transaction risk assessment, authorization, guarantees, and/or settlement services, the check-cashing entity 105 may comprise additional input devices for obtaining data used by other check-related services.

As was described in greater detail with reference to FIG. 1, the check-cashing entity 105 communicates a request for authentication of the presented check to the check authentication system 100 using a communications system.

In the embodiment shown in FIG. 3, the check authentication system 100 uses positive pay information to assess the authenticity of the check. In other embodiments, other authentication methods may additionally or alternatively be used to assess the authenticity of the check.

As depicted in FIG. 3, the check authentication system 100 is configured to communicate with a variety of exemplary embodiments of positive pay information sources 110, which are depicted individually in FIG. 3 as positive pay information sources 310-316, and which will be described in greater detail below. Data received by the check authentication system 100 from the check-cashing entity 105 is used by a positive pay router 300 that is configured to direct positive pay inquiries to one or more appropriate positive pay information sources 310-316 and/or other authentication information sources 317-318 in order to authenticate the check.

For ease of depiction, the positive pay information sources 310-316 in FIG. 3 are shown as maintaining their respective positive pay files 200 externally to the check authentication system 100. As was described with reference to FIG. 1, in other embodiments, some or all of the positive pay files 200 used by the check authentication system 100 may be stored internally to the check authentication system 100.

In FIG. 3, examples of positive pay information sources 110 depicted comprise banks 310, credit unions 311, other financial institutions 312, employers 313, payroll processors 314, third-party positive pay data providers 315, and government positive pay repositories 316. In other embodiments, other types of entities may, additionally or alternatively, provide access to positive pay information. In FIG. 3, the positive pay router 300 is further shown as being configured to allow communications with two other sources of check authentication information, namely, government authentication systems 317 and other authentication systems 318. Such systems may provide other types of authentication, such as authentication based on encrypted information from the face of the check, in addition to or as an alternative to authentication based on positive pay information.

As will be described in greater detail with reference to FIGS. 4-7, the positive pay router 300 may access positive pay information from one or more of the positive pay information sources 310-316, based at least in part on information received from the check-cashing entity 105. For example, in some embodiments, when a single source of positive pay information 110 is identified for a given check, the router may query the single source of positive pay information 110. In some embodiments, where positive pay information for a given check may be available from more than one source 110, the positive pay router may query more than one source. For example, positive pay information for a given check may be available from both an employer 313 and from the employer's payroll processor 314. As another example, positive pay information for a given check may be available from a check-issuer's bank 310 as well as from a third-party positive pay data provider 315. In some embodiments, when it is difficult to identify an appropriate source of positive pay information 110, the positive pay router 300 may query some or all of the positive pay information sources 310-316 available in order to search for relevant positive pay information. In some embodiments where all available positive pay information sources 110 are queried, the check authentication system 100 may be implemented without a positive pay router 300.

Based at least in part on positive pay information obtained from the accessed sources 310-316, the check authentication system 100 communicates a message to the check-cashing entity 105 indicating whether the check appears to be legitimate and "cashable." When positive pay information is obtained from more than one positive pay file 200, a possibility exists that the status information 215 from the files 200 may provide conflicting reports about the status of the check. In such cases, in some embodiments, the check authentication system 100 may attempt to collectively assess the various reports in order to resolve the conflict, as will be described in greater detail with reference to FIG. 7A. In some embodiments, the check authentication system 100 may transmit status information from the more than one positive pay file 200. In other embodiments, other methods are used to provide an assessment of check authenticity to the check-cashing entity 105.

In various embodiments, a point-of-sale device at the check-cashing entity 105 may be connected to the communications system between the check-cashing entity 105 and the check authentication system 100 and may receive a message from the check authentication system 100 that is indicative of the positive pay authentication performed for the presented check. The point-of-sale device may comprise a display and may be configured to display a message indicative of the authentication on the display to an operator of the point-of-sale device and/or to the check presenter 305. Based at least in part on the message received from the check authentication system 100, the check-cashing entity 105 may choose to accept the check and to give the check presenter 305 an equivalent amount of cash, goods, services, or other agreed upon exchange, minus any applicable service fees. In some embodiments, if the message received from the check authentication system 100 indicates a high level of risk associated with accepting the check, the check-cashing entity 105 may choose to decline to accept the check.

Figure 4A:
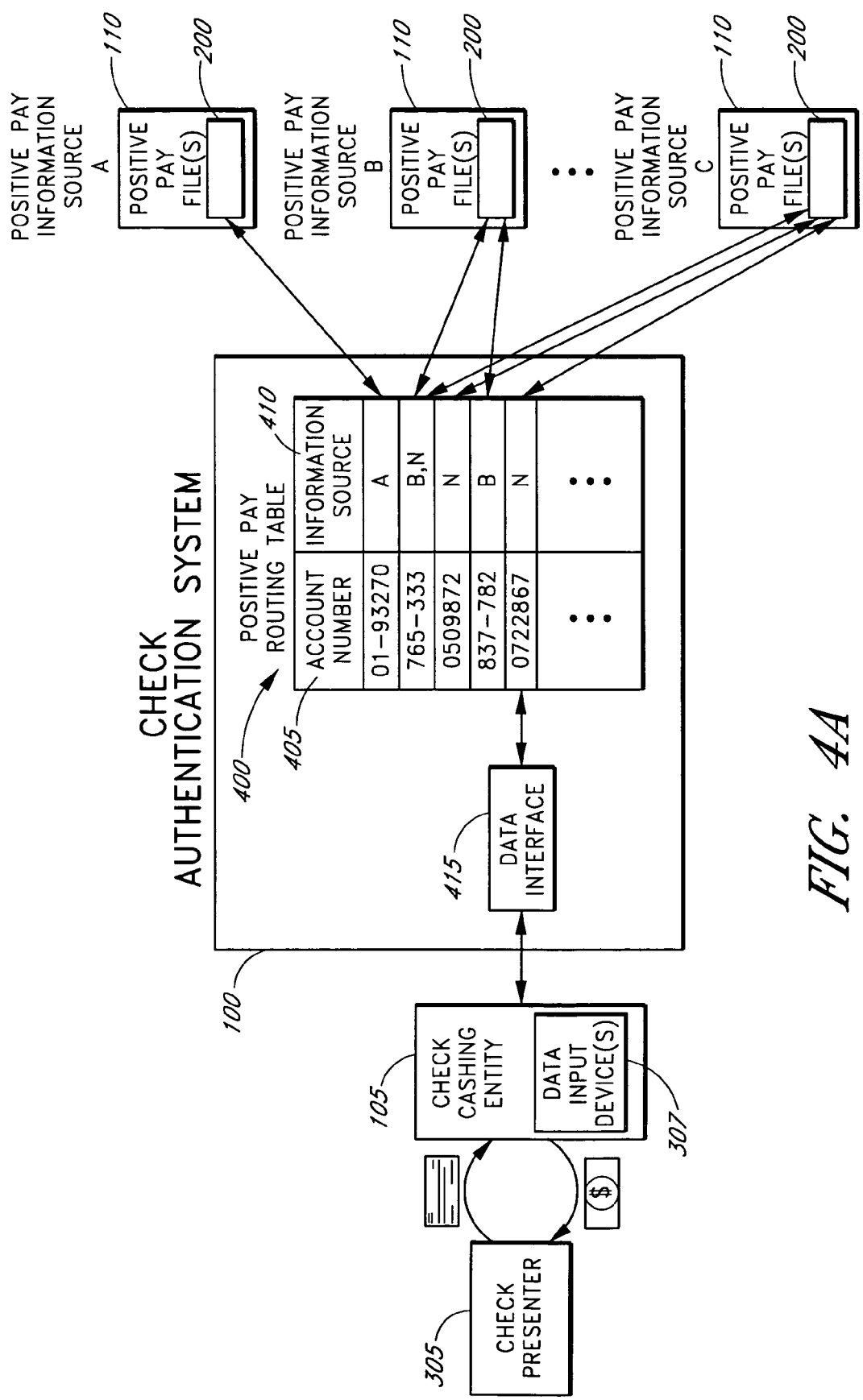
FIG. 4A is a block diagram of one embodiment of a system that allows a check authentication system to access externally stored positive pay information.
Figure 4B:
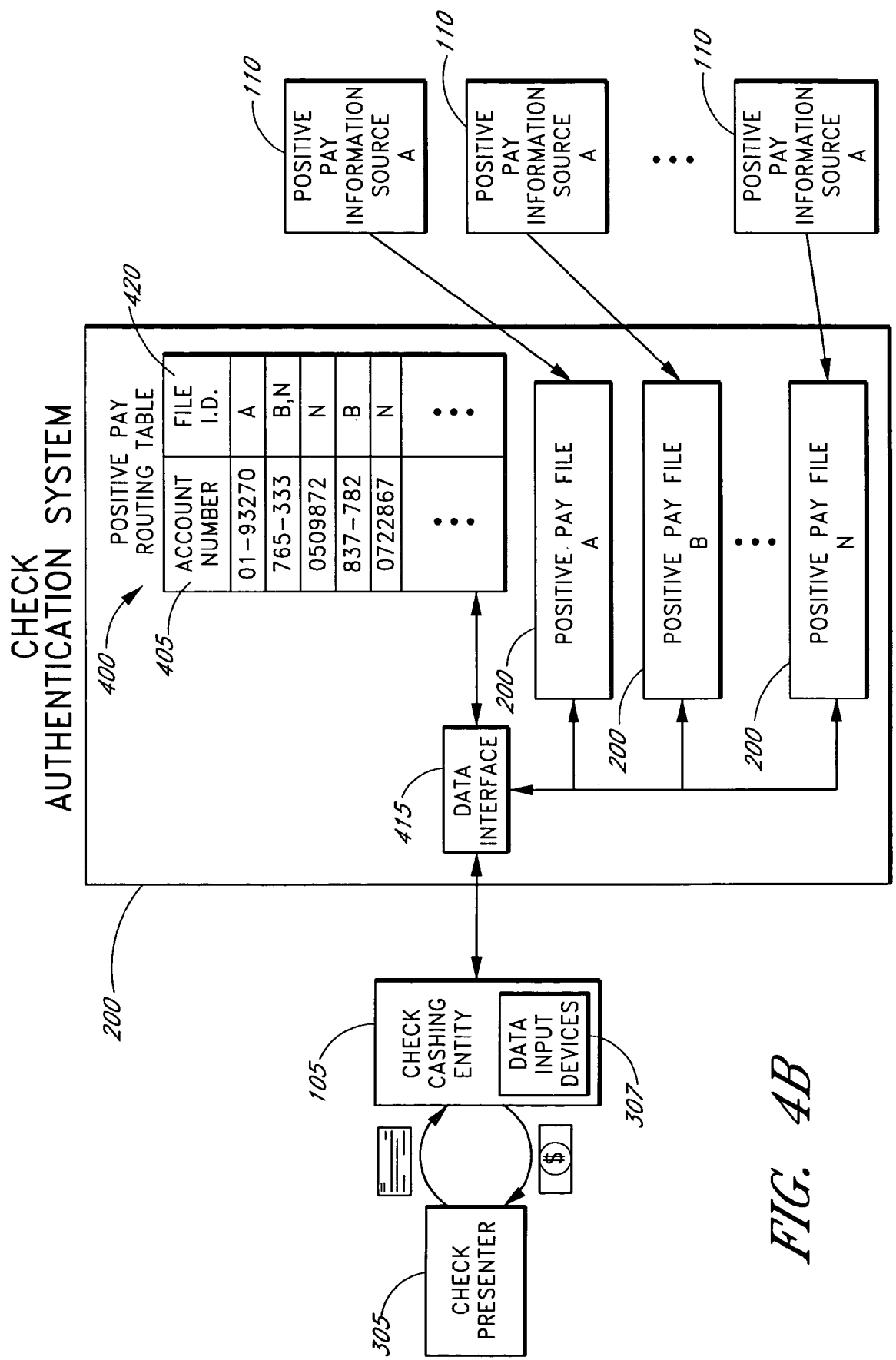
FIG. 4B is a block diagram of one embodiment of a system that allows a check authentication system to access internally stored positive pay information.

FIGS. 4A and 4B are block diagrams of two embodiments of a system for accessing positive pay information in association with a request to cash a check or other negotiable financial instrument. FIG. 4A is a block diagram of one embodiment of a system that allows a check authentication system to access externally stored positive pay information. FIG. 4B is a block diagram of one embodiment of a system that allows a check authentication system to access internally stored positive pay information.

As shown in FIGS. 4A and 4B, a check presenter 305 presents a check to a check-cashing entity 105. In one embodiment, the check-cashing entity 105 requests a authentication of the check from a check authentication system 100, based at least in part on positive pay information for the check that is available to the check authentication system 100. If the check authentication system 100 reports that the check appears to be legitimate and cashable, the check-cashing entity 105 may accept the check and pay the check presenter 305 an equivalent amount of cash, minus any fees associated with the transaction.

As was described with reference to FIG. 3, the check presenter 305 may be an individual or entity wishing to cash or otherwise exchange a check or other negotiable financial instrument. For example, in one embodiment, the check presenter 305 may be an employee wishing to cash a paycheck. In other embodiments, the check presenter 305 may wish to cash a different type of check or financial instrument, such as, but not limited to: a personal check, a tax refund check or other government-issued check, a traveler's check, bank check, official check, convenience check, money order, check card, or other type of cashable financial instrument.

As depicted in FIGS. 4A and 4B, the check presenter 305 presents a check to the check-cashing entity 105 for cashing. The check-cashing entity 105 obtains information about the check using one or more data input devices 307. Data obtained from the check may be obtained using at least one of a variety of technologies, comprising but not limited to: digital scanning, optical character recognition, MICR scanning, and manual or oral input based on visual inspection.

The check-cashing entity 105 communicates a request to the remote check authentication system 100 for positive pay authentication of the check. The check-cashing entity 105 transmits data associated with the check, which is received by the check authentication system 100 via a data interface 415. In one embodiment, the data comprises at least one of: a bank account number and bank identification number, a check issue date, a check number, an amount, a payee name, and a payor name. The data may additionally or alternatively comprise other information useful for locating positive pay information for the check or for performing other functions.

The check authentication system 100 uses the data received via the data interface 415 to access positive pay information made available by one or more sources of positive pay information 110. As was described in greater detail with reference to FIG. 3, sources of positive pay information 110 may be employers or other business or government entities that issue checks, payroll services that manage payroll accounts for employers, banks that manage payrolls accounts or other checking accounts, third-party services that provide positive pay information on behalf of entities that write checks, or the like.

As shown in FIGS. 4A and 4B, the check authentication system 100 uses the data received from the check-cashing entity 105 to attempt to access one or more associated records in a positive pay routing table 400, which stores information useful for allowing the check authentication system 100 to access one or more desired positive pay information files 200.

In the embodiments shown in FIGS. 4A and 4B, a record in the positive pay routing table 400 corresponds to a bank account for which positive pay information 100 is accessible to the check authentication system 100. The records of the positive pay routing table 400 comprise one or more fields 405 that may be used as a key for identifying a record that corresponds to the presented check, such as a routing table record that is associated with a bank account on which the presented check has been drawn. The records of the positive pay routing table 400 further comprise one or more fields 410, 420 that may be used by the check authentication system 100 to locate at least one positive pay file 200 or other repository of information about the account on which the check was drawn. For example, when the positive pay file 200 is stored internally to the check authentication system 100, the one or more fields 420 that provide location information may provide a file name or memory address at which the positive pay file 200 may be accessed, as will be described in greater detail below with reference to the individual description of FIG. 4B.

In the embodiment shown in FIG. 4A, sources of positive pay information or other reconcilement information 110 maintain positive pay files 200 that store information about checks issued by one or more check-issuers, as was described in greater detail with reference to FIG. 1. As shown in FIG. 4A, sources of positive pay information 110 may maintain their positive pay files 200 externally to the check authentication system 100. One or more communication systems associated with the positive pay information sources 110 and/or with the check authentication system 100 allow for remote communications between the information sources 110 and the check authentication system 100. Thus, queries may be sent from the check authentication system 100 to one or more identified positive pay information sources 110, and positive pay information regarding the presented check may be transmitted from the information source 110 to the check authentication system 100.

In the embodiment of the positive pay routing table 400 depicted in FIG. 4A, records of the table 400 comprise an information source field 410 that provides routing information to allow the check authentication system 100 to access one or more externally stored positive pay files 200 associated with the check. As depicted in FIG. 4A, some records in the positive pay routing table 400 may associate an account number with a single positive pay information source 110. As further depicted in FIG. 4A, some records in the positive pay routing table 400, such as the record depicted with account number "765-333," may associate an account number with more than one source of positive pay information. For example, if an employer makes positive pay information available to the check authentication system 100 both directly from the employer's bank and via a third-party positive pay information provider, then an associated record in the positive pay routing table 400 of the check authentication system 100 may provide routing information for accessing both of the information sources 110.

For example, in one embodiment, the information source field 410 may provide a uniform resource locator (URL) address or other network-based address or link that allows the check authentication system 100 to access the desired positive pay file 200 via the Internet or other computer-based system of networked processors. In another embodiment, the information source field 410 may provide a computer-accessible address of a computer server and a file name to request. As another example, the information source field 410 of the positive pay routing table 400 may provide a telephone number that may be dialed to access a human operator, a voice response system (VRS) or other automatic telephone system configured to provide information from a positive pay file 200 associated with the presented check. In other embodiments, the information source field 410 of the positive pay routing table 400 may provide other types of information useful for locating a desired positive pay file 200, as will be familiar to one of ordinary skill in the art.

Using information from the positive pay routing table 400, the check authentication system 100 may access one or more positive pay files 200 from one or more identified positive pay information sources 110. Using additional data about the check received from the check-cashing entity 105, such as a check number associated with the check, the check authentication system 100 accesses one or more records in an identified positive pay file 200 that is associated with the check, if such a record exists.

The check authentication system 100 transmits information obtained from the positive pay file 200 about the check to the check-cashing entity 105 via the data interface 415. The check-cashing entity 105 may then decide whether to accept the proposed check-cashing transaction, based at least in part on the positive pay information received from the check authentication system 100.

Referring now to FIG. 4B, the check presenter 305 presents a check to the check-cashing entity 105 for cashing, as was described above with reference to FIG. 4A. The check-cashing entity 105 communicates with the check authentication system 100, which provides a positive pay authentication for the check. Data sent by the check-cashing entity 105 is received by the check authentication system 100 via a data interface 415. In one embodiment, the data comprises at least one of: a bank account number and bank identification number, a check issue date, a check number, an amount, a payee name, and a payor name. The data may additionally or alternatively comprise other information useful for locating positive pay information for the check.

Data obtained from the check may be obtained using at least one of a variety of technologies, comprising but not limited to: digital scanning, optical character recognition, MICR scanning, and manual or oral input based on visual inspection.

In the embodiment shown in FIG. 4B, sources of positive pay information 110 provide copies of their positive pay files 200 to the check authentication system 100 for internal storage and access by the check authentication system 100. The positive pay files 200 may be updated regularly, intermittently, or as suits the preferences of the check authentication system 100 and the source of positive pay information 110.

In some embodiments, the check authentication system 100 may store separate positive pay files 200 internally for individual sources of positive pay information 110, as depicted in FIG. 4B. In other embodiments, the check authentication system 100 may join more than one positive pay file 200 received from one or more sources of positive pay information 110 into a consolidated positive pay file 200.

The check authentication system 100 may use the data received by the data interface 415 to access at least one associated record in the positive pay routing table 400. The embodiment of the positive pay routing table 400 depicted in FIG. 4B provides information that allows the check authentication system 100 to access one or more internally stored positive pay files 200 associated with the check, if such files exist and if the files 200 are identified as such, as will be described in greater detail with reference to FIG. 7B.

As depicted in FIG. 4B, the records of the positive pay routing table 400 comprise two fields: an account number field 405 and a file identification field 420. Using information about an account number received by the data interface 415, the check authentication system 100 attempts to identify at least one associated, internally stored positive pay file 200. In one embodiment, the file identification field 420 stores a computer memory address at which the desired positive pay file 200 is stored. In other embodiments, other methods for providing information to enable locating a desired positive pay file 200 are implemented using the positive pay routing table 400.

The check authentication system 100 accesses the desired internal positive pay file 200, and, using data received from the check-cashing entity 105, accesses at least one record associated with the check, if one exists.

The check authentication system 100 transmits information obtained from the positive pay file 200 about the check to the check-cashing entity 105 via the data interface 415. The check-cashing entity may then decide whether to accept the proposed check-cashing transaction, based at least in part on the positive pay information received from the check authentication system 100.

FIGS. 4A and 4B depict embodiments in which the positive pay routing table 400 provides access information for positive pay files 200 that are stored either externally or internally to the check authentication system 100, respectively. In other embodiments, at least one source of positive pay information 110 may choose to maintain its positive pay file 200 externally to the check authentication system 100, and at least one source of positive pay information 110 may choose to provide its positive pay file 200 to the check authentication system 100 for internal storage. In such a case, the positive pay routing table 400 may provide routing information for accessing both internally and externally stored positive pay files 200.

Figure 5:
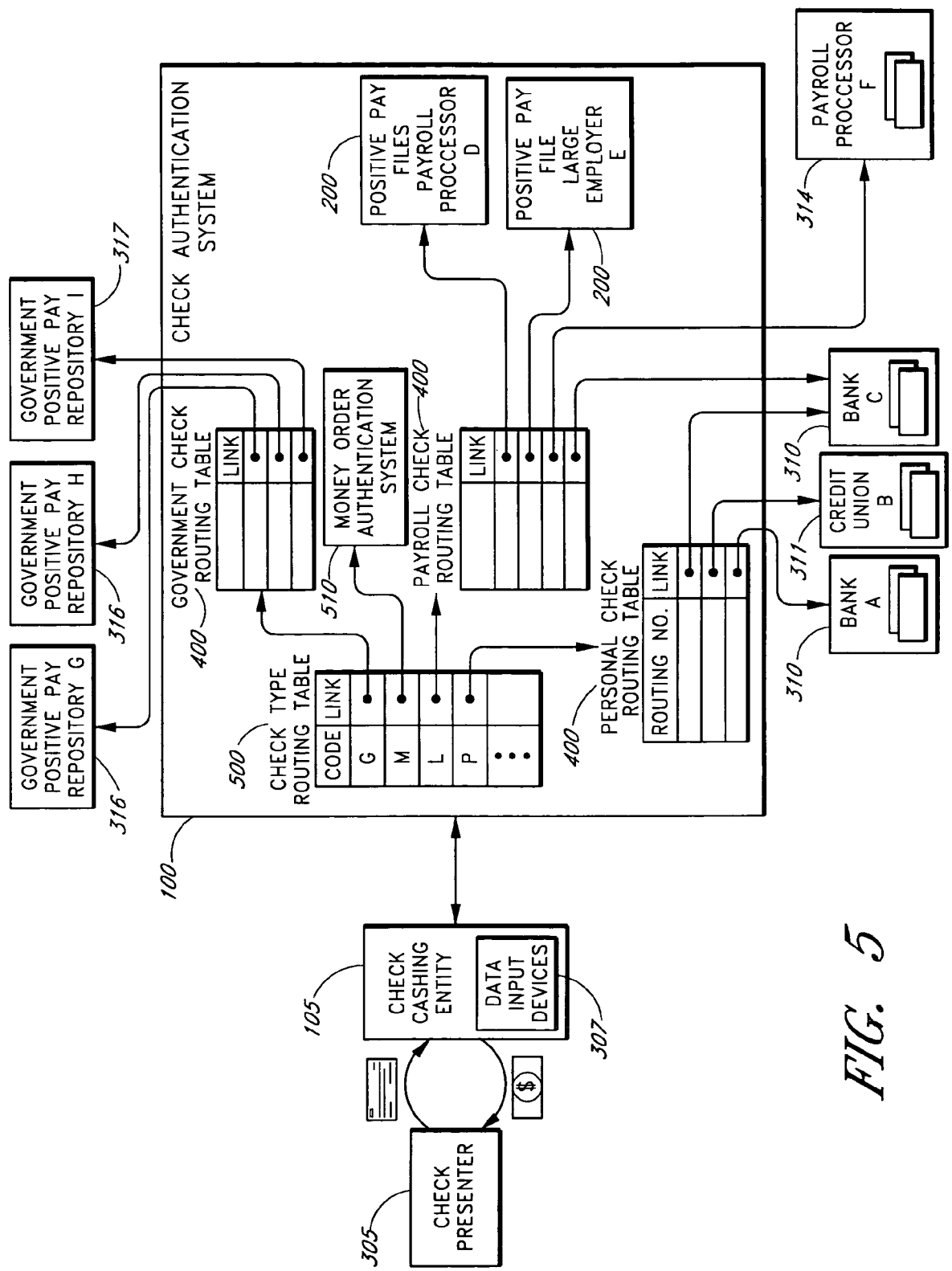
FIG. 5 is a block diagram depicting one embodiment of a check authentication system with multi-tiered positive pay routing tables.

FIG. 5 is a block diagram depicting one embodiment of a check authentication system 100 that assesses the authenticity of presented checks and other negotiable instruments based at least in part on positive pay information accessed via a system of multiple tiers of positive pay routing tables 400, 500. In the embodiment shown in FIG. 5, the check presenter 305 presents a check or other negotiable instrument to a check-cashing entity 105 for acceptance. The check-cashing entity 105 obtains information about the check, about the check presenter 305, and about other aspects of the proposed check transaction using one or more data input devices 307. In the embodiment shown in FIG. 5, an operator at the check-cashing entity 105 inputs a code signifying a type of negotiable instrument being presented for acceptance. For example, in one embodiment, the operator uses a keyboard or touchscreen to enter a 'G' if the negotiable instrument is a government check, an 'M' if the negotiable instrument is a money order, an 'L' if the negotiable instrument is a payroll check, a 'P' if the negotiable instrument is a personal check, and so forth.

The check-cashing entity 105 then transmits information about the proposed transaction to the check authentication system 100.

As depicted in FIG. 5, the check authentication system 100 comprises a system of routing tables 400, 500 and positive pay files 200. In the embodiment shown in FIG. 5, the check authentication system 100 accesses a check type routing table 500 and uses the code input by the operator at the check-cashing entity 105 to direct a search for associated positive pay, reconcilement, or other authentication information for the presented negotiable instrument.

In the embodiment shown in FIG. 5, the check type routing table 500 comprises two fields: a code field and a link field. The code field is used to identify a record in the table 500 that matches the type of the presented negotiable instrument. The link field provides an associated link to a more specialized routing table 400. For example, in FIG. 5, three additional types of routing tables 400 are depicted: a government check routing table, a payroll check routing table, and a personal check routing table. In addition, FIG. 5 depicts a money order authentication system 510, not based on positive pay information, that assesses the authenticity of money orders presented for cashing or other processing. The money order authentication system 510 is depicted in order to exemplify embodiments in which forms of authentication other than reconcilement information may be used for at least some of the authentication requests. In other embodiments, a specialized routing table 400 and reconcilement information file 200 may be maintained for money orders.

As shown in FIG. 5, if information about a check is received by the check authentication system 100, together with a code of 'G,' the check authentication system 100 may access the associated record in the check type routing table 500 where it is directed by the link in the link field to the government check routing table 400. Using a bank account identifier, or other suitable method of categorization and identification, if available, the check authentication system 100 may identify one or more suitable records in the government check routing table 400 and may follow links in the record to one or more sources of positive pay information, such as Government Positive Pay Repositories G or H 316, or Government Authentication System I 317.

Similarly, if information about a check is received by the check authentication system 100, together with a code of 'P,' the check authentication system 100 may access the associated record in the check type routing table 500 where it is directed by the link in the link field to the personal check routing table 400. Using a bank account identifier, or other suitable method of categorization and identification, if available, the check authentication system 100 may identify a suitable record in the personal check routing table 400 and follow one or more links in the record to one or more sources of positive pay information, such as Bank A 310, Credit Union B 311, or Bank C 310 depicted in FIG. 5.

If information about a check is received by the check authentication system 100, together with a code of 'L,' the check authentication system 100 may access one or more associated records in the check type routing table 500 where it may be directed by a link in the link field to the payroll check routing table 400. Using a bank account identifier, or other suitable method of categorization and identification, if available, the check authentication system 100 may identify a suitable record in the payroll check routing table 400 and may follow one or more links in the record to one or more sources of positive pay information, such as the internally stored positive pay files 200 for Payroll Processor D and for Large Employer E, or to the externally stored positive pay files available from Bank C 310 or from Payroll Processor F 314 depicted in FIG. 5.

As depicted in FIG. 5, if information about a negotiable instrument is received by the check authentication system 100, together with a code of 'M,' the check authentication system 100 may access one or more associated records in the check type routing table 500 and may be directed by one or more links in one or more link fields to the money order authentication system 510, where authentication assessment for the money order can be carried out.

In some embodiments, the check authentication system 100 may access a single positive pay file 200 in response to a request for authentication of a presented check. In some embodiments, the check authentication system 100 may accesses a plurality of positive pay files 200 in response to a request for authentication of a presented check.

For example, in one hypothetical situation, a presented check may be identified as a government check or check card, but sufficient information may not be available to identify which of a plurality of government sources 316, 317, if any, may hold information about the check. In some embodiments, the check authentication system 100 may be configured to access a plurality of the government sources 316, 317 with queries for associated positive pay information and may receive more than one positive pay status report regarding the check in question. When positive pay status reports are received from a plurality of sources, the check authentication system may use one or more systems and methods for aggregating or otherwise collectively assessing the positive pay status reports to determine an assessment of the authenticity of the check, as is described in greater detail with reference to FIG. 7A.

Whether a single information source or a plurality of sources have been queried, the check authentication system 100 may then communicate to the check-cashing entity 105 an assessment of the authenticity of the presented check.

The structure and configuration of components and communications links depicted in FIG. 5 are one of a plurality of possible structures and configurations suitable for the purposes of the check authentication system 100 described herein. Furthermore, other embodiments of the systems and methods described herein are envisioned which may comprise some, all, or none of the features described with reference to FIG. 5. Thus, FIG. 5 is intended to aid in describing and clarifying the features and not to limit the description.

Figure 6:
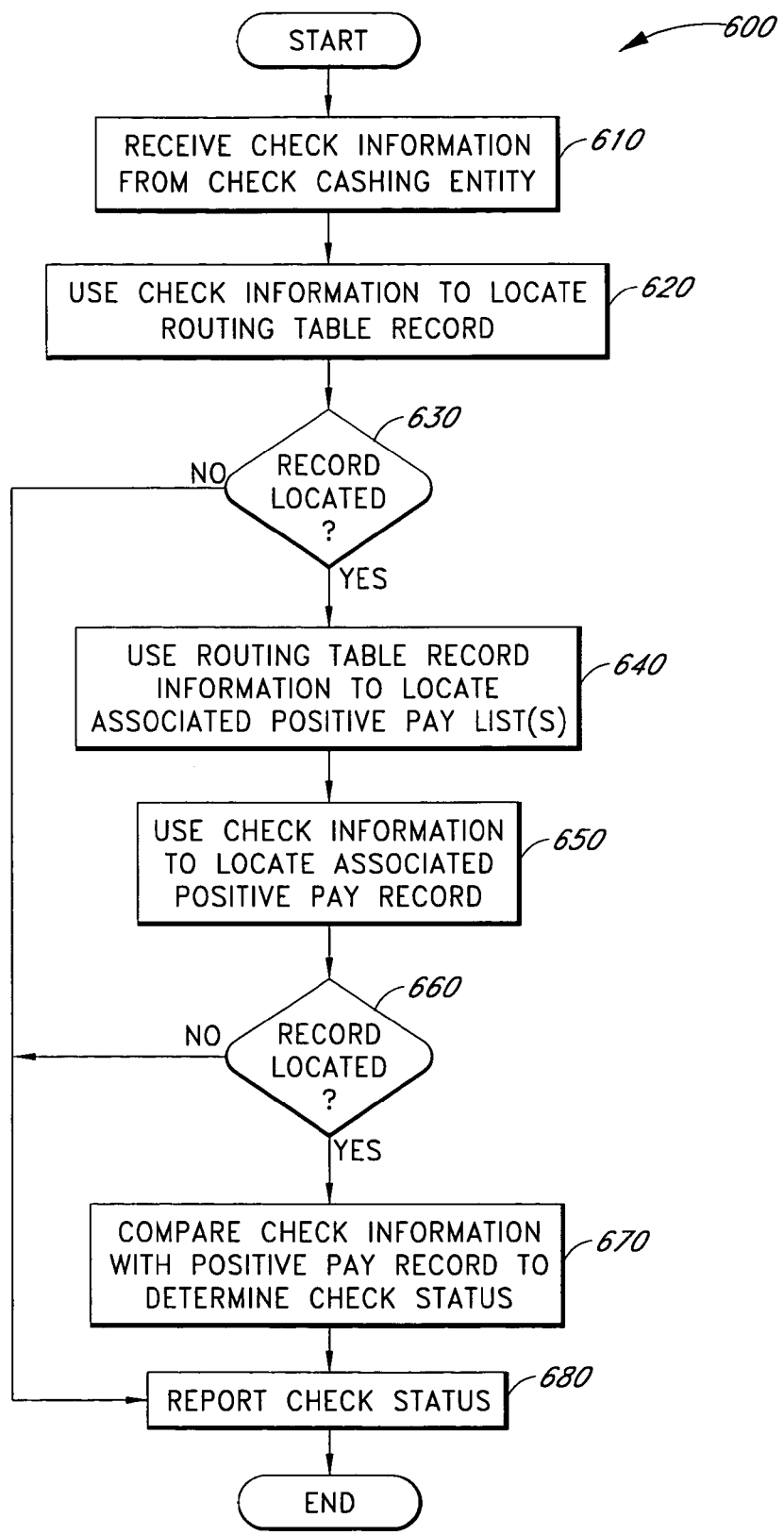
FIG. 6 is a flowchart depicting one embodiment of a process for using a routing table to access desired positive pay information.

FIG. 6 is a flowchart that depicts one embodiment of a process 600 to access positive pay information in connection with a proposed check-cashing transaction. The process 600, as described in FIG. 6, operates in association with an embodiment of the check authentication system 100 that comprises a single positive pay routing table 400, such as the embodiments portrayed in FIGS. 4A and 4B. Furthermore, the process 600 as described in FIG. 6 is configured to work with simplified embodiments of the systems and methods described herein in which a presented check may be associated with at most one identified positive pay file 200 and with at most one record within the identified positive pay file 200.

As will be familiar to one of ordinary skill in the art, other embodiments of the process 600 may be implemented to operate in association with embodiments of the check authentication system 100 that comprise more than one routing table 400, one embodiment of which is exemplified in FIG. 5. Furthermore, still other embodiments of the process 600 may be implemented to access positive pay information or other reconcilement information, such as from a plurality of information sources 110, without departing from the spirit of the systems and methods described herein.

The process 600 begins at a start state and moves to state 610 where the data interface 415 of the authentication system 100 receives information from a check-cashing entity 105 about a check presented in connection with a proposed check-cashing transaction.

Data obtained from the check may be obtained using at least one of a variety of technologies, comprising, but not limited to: digital scanning, optical character recognition (OCR), MICR scanning, magnetic-stripe reading, other card-reading technology, and manual or oral input based on visual inspection. Data obtained using one or more of these technologies, or other technologies, may, in some embodiments, be processed so as to "extract" data useful for accessing the desired positive pay information. For example, data obtained by digital scanning and/or OCR technologies may undergo such processing in order to extract a bank routing number and account number that allow the check authentication system 100 to access the routing tables 400, 500 and the positive pay files 200 associated with the presented check.

Moving on to state 620, the check authentication system 100 uses at least some of the received information about the check to locate an associated record in the positive pay routing table 400. For example, in one embodiment, as depicted in FIGS. 4A and 4B, the check authentication system 100 may use an account number and/or bank routing number received with the check information to identify an associated record within the positive pay routing table 400. In other embodiments, a payor name may be read or scanned from the face of the check, and may be used to identify an associated record. In other embodiments, an identification number printed on the check or other manner of identification may be used to identify an associated record.

As was described with reference to FIGS. 4A and 4B, the records of the positive pay routing table 400 may comprise one or more fields that may be used as a key for identifying a record that corresponds to the presented check, such as a record that is associated with a bank account on which the presented check is drawn. The records of the positive pay routing table 400 further comprise one or more fields that may be used by the check authentication system 100 to locate a positive pay file 200 or other repository of information about the source of funds on which the check is drawn. For example, when the positive pay file 200 is stored internally to the check authentication system 100, the one or more fields that provide location information may provide a file name or memory address at which the positive pay file 200 may be accessed.

Moving on to state 630, the check authentication system 100 determines whether a record associated with the check and/or account was found in the positive pay routing table 400. If no matching record was found, the process 600 moves on to state 680, where a report about the search for positive pay information associated with the check is returned to the check-cashing entity 105. For example, in one embodiment, a code of NO RECORD may be returned to the check-cashing entity 105 and no further action is taken. In other embodiments, a NO RECORD report may initiate another process, such as a process to search one or more positive pay files 200 in another attempt to locate positive pay information associated with the presented check.

Returning now to state 630, if the process 600 determines in state 630 that a record associated with the check has been located, the process 600 moves on to state 640, where the process 600 uses information from the record of the positive pay routing table 400 to locate the appropriate positive pay file 200.

Moving on to state 650, the process 600 uses information obtained about the check to attempt to locate a record in the positive pay file 200 that pertains to the presented check. For example, the process may use check sequence number information or issue date information obtained from the check-cashing entity 105 and may compare it to information stored in the check number field 211 and/or the issue date field 212 of the positive pay file 200 records to find a record that is associated with the check.

Moving on to state 660, the process 600 determines whether a record associated with the check has been located in the identified positive pay file 200. If no record matching the presented check is located, the process moves on to state 680 where a report about the search for positive pay information associated with the check is returned to the check-cashing entity 105. For example, a code of NO MATCH may be returned to the check-cashing entity 105. In other embodiments, a NO MATCH report may initiate another process, such as a process to search one or more additional positive pay files 200 in another attempt to locate positive pay information associated with the presented check.

In some situations, an accessed positive pay record may match some, but not all, of the information obtained from the check-cashing entity 105. For example, information in the check amount field 213 may differ from the obtained information by an amount that may be large or small. Information in the payee name field 214 may differ slightly or completely from a payee name obtained from the check-cashing entity 105. Various embodiments of the systems and methods described herein may be configured to address the situation of a partial positive pay match in a variety of manners, as will be familiar to one of ordinary skill in the art.

In some embodiments, a failure to locate the desired routing information in state 630 and a failure to locate the desired record in the identified positive pay file 200 in state 660 may be reported to the check-cashing entity 105 in the same manner, such as by using the same code.

In other embodiments, a failure in state 630 is reported differently than is a failure in state 660. A failure to locate the desired routing information in state 630 may indicate that the check-issuer associated with the check does not make positive pay information available or that the check authentication system 100 does not have access to the information. Thus, the lack of information may represent little if any indication as to the authenticity of the check, although some check-cashing entities 105 may prefer to cash checks for which positive pay information is available.

A failure to locate the desired record within the positive pay file 200 in state 660 may indicate that although positive pay information is available for the account on which the check is purportedly drawn, no record matching the presented check exists in the file. The lack of desired information in this situation may indicate that the check has been fraudulently prepared, or, less sinisterly, that the positive pay file 200 does not accurately represent a current list of checks issued by the check-issuer.

In various embodiments, these results, and other possible results, examples of which will be described below, may be reported to the check-cashing entity 105 and may initiate further actions as suits the preferences of the check-cashing entity 105 and the check authentication system 100.

Returning now to state 660, if the process 600 determines in state 660 that a record associated with the check has been located in the positive pay file 200, the process moves on to state 670, where the process 600 compares information about the check received from the check-cashing entity 105 with information in one or more of the fields 209-215 of the record in order to determine a check status. For example, information in the status field 215 of the record may be accessed in order to determine whether the check is listed as being available for payment or not. Furthermore, the amount of the presented check may be compared with the value stored in the amount field 213 to ensure that the amount of the check has not been altered. Similarly, the payee name associated with the presented check may be compared with a name stored in the payee name field 213.

In one embodiment, if the status field 215 indicates that the check is available for payment and if the compared fields provide a match for the received check information, then a check status of MATCH may be determined. In one embodiment, if the status field 215 indicates that the check is available for payment and if some, but not all, of the compared fields provided a match for the received check information, then a check status of PARTIAL MATCH may be determined.

If the status field 215 indicates that the check is not available for payment, then a check status indicative of the information in the status filed 215 may be determined. For example, in some embodiments, a check status of ITEM PAID, ITEM STOLEN, or ITEM STOPPED may indicate, respectively, that the check has been paid, stolen, or is subject to a stop-payment order. In some embodiments, any status indicating that the check is not available for payment may result in a check status determination of UNAVAIL. In other embodiments, other methods of determining a check status may be carried out, as suits the preferences and agreements of the check-cashing entity 105 and the check authentication system 100, without departing from the spirit of the systems and methods described herein.

From state 670, the process moves on to state 680, where a report of the check status may be transmitted to the check-cashing entity 105 before the process 600 ends.

The flowchart of FIG. 6 describes one embodiment of the process 600 to access positive pay information in connection with a proposed check-cashing transaction as comprising various states in which various functions are carried out. As will be familiar to one of ordinary skill in the art, in other embodiments, the process 600 may be executed using a different order, configuration, or set of states, and the states of the process 600 may perform the functions differently from the embodiment of FIG. 6, without departing from the spirit of the process 600.

Figure 7A:
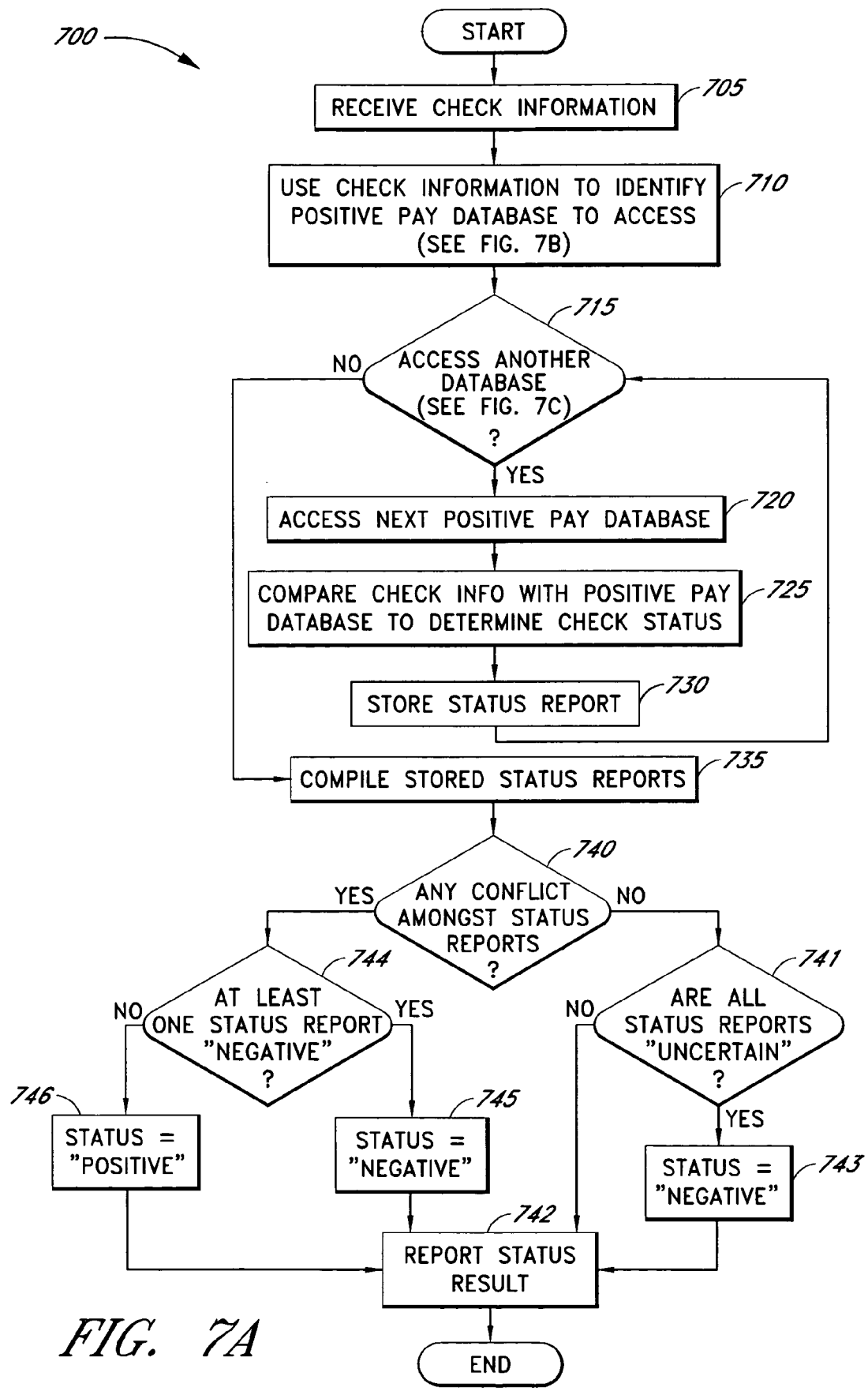
FIG. 7A is a flowchart depicting one embodiment of a process for collectively assessing positive pay information from a plurality of positive pay information sources.

FIG. 7A is a flowchart depicting a process 700 for accessing and collectively assessing positive pay information from a plurality of positive pay information sources 110. Beginning from a start state, the process moves to state 705, where the check authentication system 100 receives from the check-cashing entity 105 information about a check or other negotiable instrument for which the check-cashing entity 105 is requesting authentication.

The process moves to state 710 where the check authentication system 100 uses the information about the check to identify one or more positive pay information sources 110 that may hold information about the check. As was described with reference to FIGS. 4A and 4B, in some embodiments a bank routing number from the check may direct the process 700 to access one or more positive pay information sources 110 associated with the bank routing number. As was described with reference to FIG. 5, in some embodiments, information indicating that the check is a payroll check or that the check is a government check, or other known type of check, may direct the process 700 to access one or more positive pay information sources 110 that are deemed to be likely sources of the desired positive pay information. For example, if the negotiable instrument is a traveler's check or a money order, information to that effect may lead the process 700 to identify other sources of positive pay or other relevant reconcilement information useful for authentication of the negotiable instrument. In other embodiments, reconcilement information sources 110 may be identified for a given authentication request based on other factors.

As depicted in the embodiment of FIG. 7A, the process 700 identifies one or more positive pay information sources 110 and queries them sequentially until the identified sources 110 have been accessed, or until the process 700 otherwise identifies that no more sources 110 are to be accessed, as will be described in greater detail below with reference to the remainder of FIG. 7A and with reference to FIG. 7C. In some embodiments in which more than one source of positive pay information 110 is identified and in which sources are accessed sequentially, the identified sources 110 may be ordered in a prioritized list so that sources deemed potentially more likely to provide the desired positive pay information or more likely to meet other criteria may be queried before sources that are deemed to be less beneficial. Thus, for example, if queries are carried out until the desired information is located, the speed of a search for positive pay information may be enhanced by shortening the search with an ordered list. As will be described with reference to FIG. 7B, described below, a variety of factors may influence a process to identify and/or to prioritize positive pay information sources for authentication of a presented check.

Moving on to state 715, the process 700 determines whether any identified positive pay information sources 110 remain to be accessed. As will be described in greater detail with reference to FIG. 7C below, a variety of factors may influence a determination whether to continue a search for positive pay information in association with authentication of a presented check. In state 715, if at least one identified positive pay information source 110 remains to be accessed, the process 700 moves to state 720 where the process 700 accesses positive pay information from the next identified positive pay information source 110.

Moving on to state 725, the process 700 compares information obtained from the accessed positive pay file 200 to information about the check that was obtained in association with the check from the check-cashing entity 105, in an attempt to determine the status of the check. In various embodiments, the process 700 may search for a record associated with the check in the accessed positive pay file 200 based on a check number, issue date, bank account identifier, payee identifier, payor identifier, or other suitable field or combination of fields. Once a record is identified that appears to match the check in question, the process may perform additional checking to help ensure that the check is legitimate and unaltered. For example, information about the amount and payee name for the presented check may be compared with information in the amount field 213 and the payee name field 214 of the positive pay file 200 to ensure that neither the amount nor the payee name for the check have been altered. As was described with reference to FIG. 6, in various embodiments, situations in which a partial match with a record in the positive pay file 200 is found may be handled in a variety of ways, as suits the preferences of the check authentication system 100, the check-cashing entity 105, and/or other interested parties without departing from the spirit of the systems and methods described herein.

Moving on to state 730, a report of the status determination carried out in state 725 is stored. For example, if a record matching the check was located, and if the status field 215 and additional verification carried out by the process 700 indicate that the check appears to be legitimate, then the report comprises an indication to that effect. Likewise, if the status field 215 and/or additional verifications performed indicate a problem with the check, the report comprises an indication to that effect. Furthermore, if no record associated with the check was found, the report may comprise an indication to that effect.

From state 730, the process 700 returns to state 715, where the process 700 once again determines whether another identified positive pay information source 110 is to be accessed. If the process 700 determines that another identified positive pay information source 110 is to be accessed, the process 700 moves again to state 720 where the process 700 accesses the next identified positive pay file 200 and cycles again through states 720, 725, and 730.

If, in state 715, the process 700 determines that no identified positive pay information sources 110 remain to be accessed, the process 700 moves to state 735, where the reports from the accessed positive pay files 200 are used in order to determine a status result to transmit to the check-cashing entity 105.

From state 735, the process 700 moves to state 740, where the process 700 determines if any conflict exists amongst the status reports stored for the transaction.

For ease of description, the process 700 as depicted in the flowchart of FIG. 7A assumes an embodiment in which status report codes are simplified to a set of three possible codes: POSITIVE for when a record is found in the positive pay file 200 that matches the check and that indicates that the check is authorized for payment; NEGATIVE for when a record is found in the positive pay file 200 that matches the check and that indicates that the check has already been paid or is otherwise not authorized for payment; and UNCERTAIN for when no matching record is found in the positive pay file 200 or for when a partially matching record is found. As will be familiar to one of ordinary skill in the art, the systems and methods described herein may be modified without undue experimentation to accommodate other sets of status codes, including sets that comprise fewer than three, greater than three, or exactly three status codes, and to accommodate situations in which various identified positive pay information sources 110 employ different sets of status codes.

Returning now to the example illustrated in FIG. 7A, if, in state 740, the status reports share the same code, that is, if no conflict exists amongst the status reports, the process 700 moves from state 740 to state 741.

In state 741, the process 700 determines whether the status report code shared by the reports is UNCERTAIN. If the status report code is determined not to be UNCERTAIN then, by implication, the status reports are unanimously POSITIVE or unanimously NEGATIVE. In the embodiment depicted in FIG. 7A, if the status report code is determined not to be UNCERTAIN, the process 700 assigns a status report code that matches the unanimous code and moves on to state 742.

Returning to state 741, if the status report code is UNCERTAIN, then, by implication, no identified positive pay file 200 holds a POSITIVE or a NEGATIVE record associated with the check. In the embodiment depicted in FIG. 7A, the process 700 moves to state 743 where an authentication status result of NEGATIVE is assigned for the transaction, and the process 700 moves on to state 742. In other embodiments, one or more of various other actions may take place when the status report code is UNCERTAIN. For example, an authentication status result of POSITIVE may be assigned for the transaction; a message that no authentication status result can be determined may be returned to the check-cashing entity 105; additional information may be requested from the check-cashing entity 105 in order to attempt another search for positive pay information; an authentication status result of UNCERTAIN may be determined. Thus one or more rules for determining a method of processing status result codes may be used by the check authentication system 100 as is deemed beneficial to the check authentication system 100 and the check-cashing entity 105.

Returning now to state 740, if the process 700 determines that conflict does exist amongst the stored status reports, that is, if the status reports are not unanimous, then the process 700 moves on to state 744, where the process 700 determines if at least one status report comprises a NEGATIVE code.

If at least one status report comprises a NEGATIVE code, the process 700 moves on to state 745, where a authentication status result of NEGATIVE is assigned for the transaction, and the process 700 moves on to state 742.

Returning now to state 744, if the process 700 determines that there is not at least one status report with a code of NEGATIVE, then the implication is that the status reports comprise a mix of status codes POSITIVE and UNCERTAIN. The process 700 moves on to state 746, where a authentication status result of POSITIVE is assigned for the transaction, and the process 700 moves on to state 742.

In state 742, the authentication status result may be reported to the check-cashing entity 105 and/or may initiate further actions as suits the preferences of the check-cashing entity 105 and the check authentication system 100.

FIG. 7A depicts one embodiment of a process 700 to collectively assess positive pay information from a plurality of positive pay information sources 110. The process 700, as described in FIG. 7A, comprises various states in which various functions are carried out. As will be familiar to one of ordinary skill in the art, in other embodiments, other schemes or set of rules for collectively assessing positive pay information from a plurality of positive pay information sources 110 may be implemented without departing from the spirit of the systems and methods described herein. Thus, the process 700 may be executed using a different order, configuration, or set of states, and the states of the process 700 may perform the functions differently from the embodiment of FIG. 7A.

For example, although the process 700 is depicted in the flowchart of FIG. 7A as identifying and subsequently sequentially accessing sources of positive pay information 110, in one embodiment, the process 700 identifies a first source of positive pay information 110, accesses the first source 110, and, if the desired information is not available from the source, the process 700 identifies and accesses a second potential source of positive pay information 110, and so on.

In other embodiments, the check authentication system 100 broadcasts requests for positive pay information about a check to available positive pay information sources 110, or to an identified subset of the sources 110, and waits for responses from the sources 110. In one such embodiment, the process 700 waits for responses from the sources 110 to whom requests were broadcast. In another such embodiment, the process 700 waits until a pre-determined time limit is reached, and collectively assesses the responses received within the time limit. In another embodiment, the process 700 waits until a POSITIVE or a NEGATIVE response is received, and reports the POSITIVE or the NEGATIVE authentication status result to the requesting check-cashing entity 105. In yet another embodiment, the process 700 assumes that the status code from a source 110 is POSITIVE, unless a message indicative of another code is received from the source 110.

As another example of alternative embodiments of the process 700, rather than storing a status report when a positive pay file 200 is accessed and compiling the status reports when no positive pay files 200 remain to be accessed, as is described with reference to states 730 and 735 in FIG. 7A, other embodiments of the process 700 may update the status result as each new status report is obtained from a source of positive pay information 110, without storing the newly obtained status report. The update process may operate to produce the same results as the example scheme depicted in states 740-746 or in accordance with one or more other update schemes.

Furthermore, in one embodiment, the process 700 resolves a conflict between POSITIVE status reports and NEGATIVE status reports by maintaining counts for each of the status report types and by determining that the status result to be reported to the check-cashing entity 105 will be assigned to match the status report type with the higher count.

In embodiments where the status fields 215 of the accessed positive pay files 200 comprise a date associated with the status, the process 700 may choose a most recently dated status, may weight the stored status reports based on how recent is the associated date in the status field 215, or may use the date information from the status field 215 in another manner to assist in determining a status result to report to the check-cashing entity 105.

Thus, a variety of embodiments exist for the process 700 to collectively assess positive pay information from a plurality of positive pay sources 110, comprising both those embodiments described herein as well as others as will be familiar to one of ordinary skill in the art.

Figure 7B:
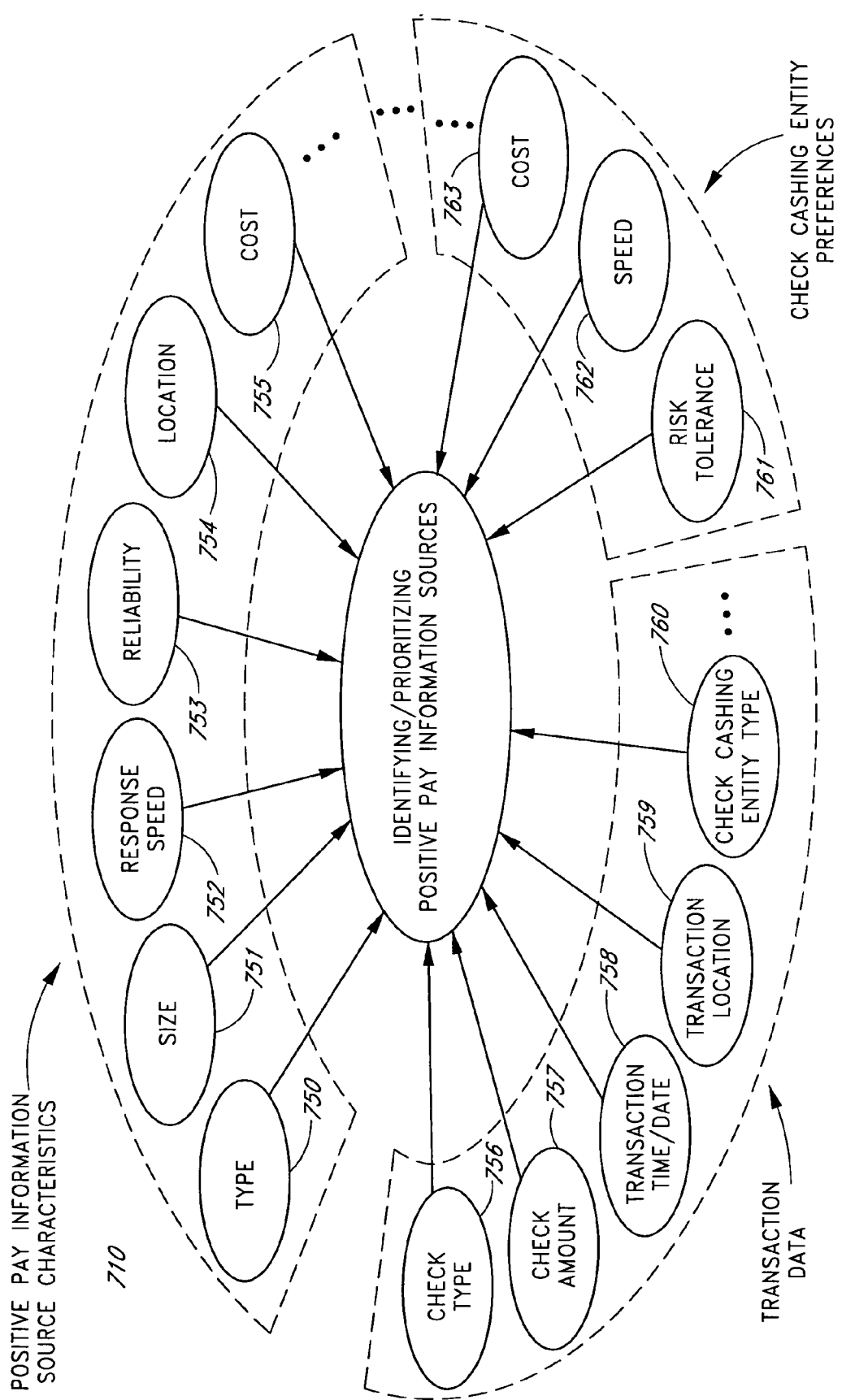
FIG. 7B is a diagram depicting exemplary factors that may influence a process to identify and order positive pay information sources for authentication of a presented check.

FIG. 7B depicts exemplary factors 750-763 that may influence the process 710 to identify and/or prioritize positive pay information sources 110 for authentication of a presented check. By way of background, as was described with reference to FIG. 1, in various embodiments, the check authentication system 100 and the check-cashing entity 105 enter into a service agreement in which the check authentication system 100 provides positive pay authentication services to the check-cashing entity 105 that may be customized to suit service preferences and guidelines expressed by the check-cashing entity 105. Thus, the exemplary factors 750-763 depicted in FIG. 7B may influence the process 710 to identify and/or prioritize the list of positive pay information sources 110 for querying differently, based at least in part on the preferences and characteristics of the service agreements entered into by the check authentication system 100 and the check-cashing entity 105.

For ease of description and conceptualization, the factors 750-763 are presented as being divided into three categories: factors 750-755 that are based on characteristics of the individual positive pay information sources 110, factors 756-760 that are based on data associated with the transaction for which check authentication is being requested, and factors 761-763 that are based on preferences of the check-cashing entity 105 requesting the authentication. In other embodiments, other factors and/or categories of factors may additionally or alternatively be used to identify and/or to prioritize the access of positive pay information sources 110 by the check authentication system 100.

As depicted in FIG. 7B, several factors 761-763 may be associated with preferences and characteristics of the check-cashing entity 105 that submits the authentication request. Factors such as the check-cashing entity's 105 declared level of risk tolerance 761, preference for speed of response 762, and/or monetary cost considerations 763 may influence the selection and/or prioritization of information sources 110 to access. For example, a preference on the part of the check-cashing entity 105 for very fast processing of authentication requests, possibly especially so during certain seasons, such as during a region's tourist or other busy season, may influence a decision to select one or a few sources 110, or to place sources that are known to provide speedy responses to queries towards the beginning of the ordered list of sources 110 to access. As another example, a very low level of tolerance for risk 761 on the part of the check-cashing entity 105, perhaps based on a high incidence of fraudulent check cashing attempts, may lead to a more thorough selection of sources 110. Similarly, monetary cost considerations 763 may influence the selection of sources 110 when at least some of the identified sources 110 make their reconcilement information available for fees of different amounts. For example, an employer 313 may choose to provide free access to data from its positive pay files 200 as part of an effort to reduce its exposure to fraudulent checks, while a third-party positive pay data provider 315 may, for a fee, provide access to positive pay files 200, possibly from a large number of check-issuers, and possibly comprising positive pay files 200 for the employer 313.

If, in the previous example, accessing positive pay information directly from the employer 313 is a time-consuming and error-prone process, while accessing the information via the third-party positive pay data provider 315 is more efficient and expedient, the check authentication system 100 may select one or both of the sources 110 based at least in part on knowledge of these characteristics as well as on an appropriate balance of the check-cashing entity's preferences regarding speed 762, cost 763, and risk tolerance 761.

In addition to or as an alternative to the factors 761-763 cited above, a check-cashing entity 105 may have other preferences that affect selection and/or prioritization of reconcilement information sources 110 for a given check authentication request. For example, the entity 105 may have special relationships with one or more information sources 110 that affect its desired choice of sources; the entity 105 may request special handling of certain types of checks; the entity 105 may have a service agreement with the check authentication system 100 that is tied in with other check-related services, such as check guarantee services, that affect the choice of positive pay information sources for a given authentication transaction, and so on.

As further depicted in FIG. 7B, knowledge on the part of the check authentication system 100 regarding characteristics of the information sources 110 from which it requests reconcilement information may influence the selection 710 of positive pay information sources 110 for authenticating a presented check. For example, a positive pay information source 110 may be associated with a given type of check, such as government checks or checks issued by a known payroll processor, and may be of more potential value in searches requesting this type of information. Thus, a type 750 of a source 110 may be a factor in a selection and/or prioritization of sources 110.

The size 751 of a positive pay information source 110 may influence whether it is selected for a given search. For example, in some embodiments of the selection process 710, if the source 110 is deemed to be more comprehensive than other available sources 110, thus representing a better use of time, processor, financial, and/or other resources allocated for the authentication search, it may be given a higher priority in a list of identified sources 110. On the other hand, if the source's size is associated with a reduction in response speed 752, another possible factor, then the source 110 may be given a lower priority in some situations.

A known reputation for reliability 753, or a lack thereof, may be a factor in some embodiments of the selection process 710, and may be balanced with and against the influences of other factors 750-763.

A location 754 associated with the positive pay information source 100 may influence the selection of positive pay information sources 110 for a given positive pay information request. Location 754 as a factor may refer to whether the positive pay file 200 is located internally or externally to the check authentication system 100. Additionally or alternatively, location 754 as a factor may refer to a geographical area of coverage associated with the information available from the source 110. For example, if a given payroll processor 314 makes positive pay information available in comprehensive files based on geographic region, the check authentication system 100 may choose to give a higher priority to the file associated with the geographic region from which the check to be authenticated is believed to have been issued. In other embodiments, other location-related characteristics 754 associated with the positive pay information sources may be used as factors in a process 710 to select and/or to prioritize positive pay information sources 110.

As described above, providers of positive pay and other reconcilement information may charge a fee for access to the information that they store, and monetary cost 755 associated with accessing a given source 110 of information may influence the selection and/or prioritization of the source 110.

Other positive pay information source characteristics may be taken into consideration in addition to, or as an alternative to, the exemplary positive pay information source characteristics 750-755 described with reference to FIG. 7B. For example, knowledge about how a given positive pay information source 110 categorizes and reports on the status of its checks may be relevant as an indicator of the accuracy of the source 110. As another example, if information is available regarding a date or time in which data in a positive pay information source 110 was most recently updated, this information may be used to in identifying and/or prioritizing positive pay information sources 110 for querying. Thus, in one embodiment, even if a positive pay information source 110 is known to frequently have data that is less current than desired by a check-cashing entity 105, its data may be acceptable if known to have been very recently updated.

As still further depicted in FIG. 7B, the task of identifying and/or prioritizing positive pay information sources 110 for querying in association with a request for check authentication may be influenced by factors 756-760 associated with the specific check-cashing transaction in question. Information about a check type 756, a check amount 757, a transaction time and/or date 758, a transaction location 759, and/or a check-cashing entity type 760 associated with a transaction for which authentication is requested may individually or in combination influence the selection 710 of positive pay information sources 110 for authenticating the presented check. Transaction data factors 756-760, especially when used in conjunction with historical data that the check authentication system 100 may possess regarding past check-cashing transactions and in conjunction with check-cashing entity preferences 761-763, may influence selection and/or prioritization of sources 110 at least in part due to their association with known levels of risk and fraud patterns.

For example, as described with reference to FIG. 5, data about a check type 756 associated with a presented check or other negotiable instrument may influence a process to identify positive pay information sources 110 for use in authenticating the negotiable instrument. That is, in some situations, knowledge of a type 756 associated with a negotiable instrument may assist a check authentication system 100 to focus on sources with a higher likelihood of storing the desired information. In various embodiments, check type 756 information may comprise information about whether the negotiable instrument is a payroll check, a government check, a personal check, traveler's check, a money order, or the like. Check type 756 for payroll checks may also, in some embodiments, refer to a payroll processor who processes the checks and who may make positive pay information about the checks available. In some embodiments, check type 756 information may refer to a bank or other financial institution holding the account on which the check is drawn. In other embodiments, check type 756 may be defined to categorize checks in other ways as is deemed desirable for accessing positive pay or other reconcilement information about the checks.

As another example, a check-cashing entity 105 may have a lower risk tolerance 761 when the check amount 757 is higher, and may be willing to accept a higher monetary cost 763, 755 and a lower speed of response 762, 752, especially for information that is more reliable 753. As another example, a check-cashing entity 105 whose type 760 is a gas station convenience store may similarly prefer to expend more resources on a request for authentication information for a transaction that takes place at a historically riskier time and/or date 758, such as after midnight or near the end of the month, if a very large, local employer issues payroll checks on the 1$^{st}$ and 15$^{th}$ of the month. The location 759 of a proposed check-cashing transaction may further influence the selection 710 of positive pay information sources 110 for authenticating a presented check, serving to increase or decrease the effect of other factors 750-763.

Thus, FIG. 7B describes an exemplary set of factors 750-763 that may influence a process 710 for selecting and/or prioritizing positive pay information sources 110 for querying in a search for positive pay status information. In other embodiments, some, all, or none of the factors 750-763 described, possibly with additional or alternative factors, may influence the process 710, without departing from the spirit of the systems and methods described herein.

By way of background for FIG. 7C, as was described with reference to FIG. 7A, in some embodiments of the process 700 to access and collectively assess status information from a plurality of positive pay information sources 110, a set of sources 110 is identified and subsequently accessed sequentially for positive pay status information regarding the presented check. Reports received from the sources 110 may be stored and collectively assessed for determining a result to transmit to the requesting check-cashing entity 105. In various such embodiments, the process 700 determines whether to access the whole set of identified sources 110 or whether to access a subset of the identified sources 110. In other embodiments of the process 700, positive pay information requests may be broadcast to the set of identified sources 110, and responses received may similarly be collectively assessed, either when responses from the whole set of sources 110 has been received or when a subset of the sources 110 has responded. In still other embodiments of the process 700, the check authentication system 100 may identify and access an individual positive pay information source 110, obtaining and storing a report, before determining whether to identify and access another source 110. In other embodiments, positive pay information sources 110 may be accessed, and the status reports obtained from them may be collectively assessed according to another scheme.

The process 715 to determine when to continue a search for positive pay information may apply to any of the above-mentioned embodiments. Thus, when the check authentication system 100 accesses a set of sources 110 sequentially, the process 715 may determine, after each access, or after a set of accesses, whether to access one or more additional sources. Similarly, the process 715 may determine how long to continue waiting and to continue collecting responses when positive pay authentication requests are broadcast to a set of sources 110.

FIG. 7C is a diagram depicting exemplary factors 770-776 that may influence a process 715 to determine when to continue a search for positive pay information in association with authentication of a presented check. In various embodiments, and based on one or more factors 770-776, as exemplified in FIG. 7C, the process 715 may determine to continue the search until status reports from the whole set or a pre-determined number of identified sources 110 have been obtained, may determine to continue the search until a pre-determined time limit has been reached, may determine to continue the search until a pre-determined level of certainty has been obtained from the reports, and/or may determine to continue the search until another determination has been made.

As depicted in FIG. 7C, factors 773-776 based on preferences of the check-cashing entity 105 may influence a determination whether to continue searching for positive pay status information associated with a given authentication request. For example, a transaction processing speed preference 773 may exert influence that serves to limit the search based on a time interval between receipt of an authentication request by the check authentication system 100 from the check-cashing entity 105 and transmission of a status result back to the check-cashing entity 105. A cost preference 774 may exert influence that serves to limit a search based on an amount of money spent the search. A risk tolerance level 775 may influence a determination to prolong a search in order to obtain a higher degree of certainty regarding a positive pay status result or may allow other factors to exert greater influence when exposure to a higher level risk is tolerated. Similarly, other preferences 776 on the part of the check-cashing entity 105 may influence the determination 715.

Transaction data 770 received in association with the authentication request may influence the determination 715 in conjunction with the check-cashing entity preferences 773-776 and insofar as the transaction data 770 may serve to limit the number of available positive pay information sources 110 that are relevant to the presented check. Information about characteristics of available positive pay information sources 110 may also influence a determination whether to continue searching for positive pay status information.

In addition to, or as an alternative to the aforementioned factors 770-771, 773-776, knowledge about characteristics of positive pay information 772 in general may influence a determination whether to continue searching for positive pay status information. For example, it may be known that information stored in the status field 215 of a positive pay file 200 is more likely to be changed over time from POSITIVE, indicating that the associated check is available for cashing, to NEGATIVE, indicating that the check has already been cashed, than the status information 215 is likely to change from NEGATIVE to POSITIVE. Thus, for a search associated with a very low tolerance for risk, the process 715 may determine that continued searching after receiving a POSITIVE result may be warranted, while continued searching after receiving a NEGATIVE result may not enhance the reliability of the authentication result transmitted to the check-cashing entity 105. In various embodiments, a determination whether to continue searching for additional positive pay information may take into account situations in which a partial match with stored positive pay records is found, and may be able to assess acceptable versus unacceptable deviations from a complete match. Other examples of knowledge of positive pay characteristics 772 that may influence a determination 715 whether to continue searching for positive pay status information may be based on the meanings and uses of specific codes employed by various positive pay sources 110.

Thus, basing a determination 715 regarding whether to continue a search for positive pay information in association with authentication of a presented check on factors such as the factors 770-776 exemplified in FIG. 7C and, additionally or alternatively, on other factors that will be familiar to one of ordinary skill in the art, allows the check authentication system 100 to customize a search for positive pay status information to suit individual proposed check-cashing transactions. For example, in some embodiments, information available about positive pay and/or check fraud patterns that may be known may be used as a factor in a determination 715 regarding whether to continue querying sources of positive pay information. In other embodiments, some, all, or none of the factors 770-776 described, possibly with the addition of other factors, may influence the process 715, without departing from the spirit of the systems and methods described herein.

Although the foregoing systems and methods have been described with reference to FIGS. 1-7C in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A computer implemented method for determining whether to access additional positive pay information in association with a proposed check-cashing transaction, the method comprising:

electronically receiving, by a check authentication system, a request from a check-cashing entity for positive pay status information for a check presented in association with a proposed check-cashing transaction;

identifying, by the check authentication system, at least one source of positive pay information by accessing a table indicating the external location of the positive pay information;

accessing, by the check authentication system, positive pay information from at least said one of said external location positive pay information sources;

electronically storing the accessed positive pay information;

accessing, by the check authentication system, additional information about at least one of the set consisting of: characteristics of the proposed check-cashing transaction, characteristics of the identified positive pay information sources, and preferences of the check-cashing entity; and electronically determining, by the check authentication system, whether to access additional positive pay information, based at least in part on at least one of the set consisting of: the accessed positive pay information and the accessed additional information, wherein the above elements are performed by one or more computers associated with the check authentication system.

2. The method of claim 1, wherein identifying at least one source of positive pay information comprises identifying at least one positive pay information source that stores positive pay information about an account on which the check is drawn.

3. The method of claim 1, wherein identifying at least one positive pay information source comprises identifying at least one positive pay information source that stores positive pay information about a type of check that is related to the check.

4. The method of claim 1, wherein accessing positive pay information comprises obtaining at least one positive pay status report associated with the check.

5. The method of claim 1, wherein accessing additional information about characteristics of the proposed check-cashing transaction comprises accessing information about at least one of the set consisting of: a date of the proposed transaction, a time of the proposed transaction, a location of the proposed transaction, a check type associated with the check, a check amount associated with the check, and a type of check-cashing entity at which the transaction is proposed to take place.

6. The method of claim 1, wherein accessing additional information about characteristics of the identified positive pay information sources comprises accessing information about at least one of the set consisting of: cost of accessing the information from the sources, reliability of the information available from the sources, location of the information sources, response speeds of the information sources, size of the information sources, and type of check associated with the positive pay sources.

7. The method of claim 1, wherein accessing additional information about preferences of the check-cashing entity comprises accessing information about at least one of the set consisting of: preferred risk tolerance level, preferences regarding speed of determining a positive pay status result, and preferences regarding cost of determining a positive pay status result.

8. The method of claim 1, wherein determining whether to access additional positive pay information comprises determining at least one of the set consisting of: determining whether an obtained positive pay status result meets the preferences of the check-cashing entity, determining whether the preferences of the check-cashing entity indicate that no more time is to be expended on a search, determining whether the preferences of the check-cashing entity indicate that no more monetary resources are to be expended on a search, determining not to access more if at least one accessed result is negative, and determining to continue accessing if all accessed result are uncertain.

9. The method of claim 1, further comprising determining a positive pay status result for the proposed check-cashing transaction by collectively assessing the accessed positive pay information.

10. A check authentication system, comprising:

a data interface configured to receive a request from a check-cashing entity for positive pay authentication in association with a proposed check-cashing transaction, wherein the request comprises information about characteristics of the proposed check-cashing transaction;

a computer-accessible storage medium configured to store additional information about characteristics of one or more positive pay information sources including external location information as to where the positive pay information is accessible and information about preferences expressed by the check-cashing entity; and a processor configured to query at least one positive pay information source in its external location for positive pay information associated with the proposed check-cashing transaction, the processor further configured to determine thereafter whether to query at least one additional positive pay information source, based at least in part on at least one of the set consisting of the information about characteristics of the proposed check-cashing transaction, at least one positive pay authentication status report received in response to a query, and the stored additional information.

11. The system of claim 10, wherein the positive pay information comprises at least one positive pay status report associated with the check.

12. The system of claim 10, wherein the additional information about characteristics of one or more positive pay information sources comprises information about at least one of the set consisting of cost of accessing the information from the sources, reliability of the information available from the sources, location of the information sources, response speeds of the information sources, size of the information sources, and type of check associated with the positive pay sources.

13. The system of claim 10, wherein the information about preferences expressed by the check-cashing entity comprises information about at least one of the set consisting of: preferred risk tolerance level, preferences regarding speed of determining a positive pay status result, and preferences regarding cost of determining a positive pay status result.

14. The system of claim 10, wherein the processor determines whether to query at least one additional positive pay information source based at least in part on one of the set consisting of: a determination of whether an obtained positive pay status result meets the preferences of the check-cashing entity, a determination of whether the preferences of the check-cashing entity indicate that no more time is to be expended on a search, a determination of whether the preferences of the check-cashing entity indicate that no more monetary resources are to be expended on a search, a determination not to access more if at least one accessed result is negative, and a determination to continue accessing if all accessed result are uncertain.

15. The system of claim 10, wherein the processor is further configured to determine a positive pay status result for the proposed check-cashing transaction by collectively assessing the accessed positive pay information.

16. A computer implemented method for reducing risk associated with accepting a check offered at a check-cashing transaction, the process comprising the acts of:
electronically entering into an agreement with a check authentication system in which the check authentication system agrees to perform positive pay check authentications;
informing the check authentication system of preferences associated with positive pay check authentications;
electronically transmitting information associated with a positive pay authentication request for a proposed check-cashing transaction to the check authentication system wherein the check authentication system includes location information about the location of positive pay information that is external to the check authorization system;
electronically accessing the external source of positive pay information to obtain a positive pay information result;
electronically determining whether to access an additional external source of positive pay information based at least in part on one of (i) the preferences associated with positive pay check authentications or (ii) the positive pay information accessed from the external source;
electronically receiving from the check authentication system data indicative of a positive pay authentication result, wherein the positive pay authentication result is based at least in part on information electronically obtained from at least one positive pay information source selected based at least in part on the transmitted information associated with the proposed check-cashing transaction and on the preferences associated with positive pay authentications; and
electronically determining whether to accept the check offered at the proposed check-cashing transaction, based at least in part on the positive pay authentication result,
wherein the above acts are performed by one or more computers.

17. A check-cashing entity configured to transmit to a check authentication system information associated with a proposed check-cashing transaction, the check-cashing entity further configured to transmit preferences regarding positive pay authentications to be carried out by the check authentication system, wherein the information and the preferences enable the check authentication system to determine, after querying at least one source of positive pay information external to the authorization system, whether to query at least one additional source of positive pay information.

18. A computer implemented method for obtaining positive pay information associated with a proposed check-cashing transaction, the method comprising:
electronically providing a check authentication system with information about preferences regarding positive pay-information searches performed by the check authentication system, wherein the provided information enables the check authentication system to determine whether to continue querying positive pay information sources external to the authorization system in searches for positive pay information that are associated with proposed check-cashing transactions;
electronically transmitting a request to the check authentication system for positive pay information associated with a proposed check-cashing transaction, wherein the transmitted request triggers the check authentication system to locate and query a positive pay information source external to the check authorization system for positive pay information associated with the proposed check cashing transaction and wherein the electronically transmitted request thereafter triggers a determination about whether to continue querying positive pay information sources in a search for positive pay information associated with the proposed check-cashing transaction; and electronically obtaining from the check authentication system positive pay information associated with the proposed check-cashing transaction,
wherein the above elements are performed by one or more computers.

19. A system for determining whether to continue a search for positive pay information, comprising:
means for receiving a request from a check-cashing entity for positive pay status information for a check presented in association with a proposed check-cashing transaction;

means for identifying at least one source of positive pay information that is external to the means for receiving a request;

means for accessing positive pay information from at least one of the identified sources;

means for accessing additional information about at least one of the set consisting of: characteristics of the proposed check-cashing transaction, characteristics of the identified positive pay information sources, and preferences of the check-cashing entity; and means for determining whether to access additional external positive pay information source, based at least in part on at least one of the set consisting of: the accessed positive pay information and the accessed additional information.

* * * * *

UNITED STATES PATENT AND TRADEMARK OFFICE
CERTIFICATE OF CORRECTION

| | | |
|---|---|---|
| PATENT NO. | : 7,640,205 B2 | Page 1 of 1 |
| APPLICATION NO. | : 10/744706 | |
| DATED | : December 29, 2009 | |
| INVENTOR(S) | : Michaelassi et al. | |

It is certified that error appears in the above-identified patent and that said Letters Patent is hereby corrected as shown below:

Column 37, Line 54 – Change "process" to --method--

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO.       : 7,640,205 B2                                    Page 1 of 1
APPLICATION NO. : 10/744706
DATED            : December 29, 2009
INVENTOR(S)      : Michelassi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1872 days.

Signed and Sealed this

Ninth Day of November, 2010

David J. Kappos
*Director of the United States Patent and Trademark Office*